United States Patent
Yamagata et al.

(10) Patent No.: US 7,978,897 B2
(45) Date of Patent: Jul. 12, 2011

(54) COMPUTER-AIDED IMAGE DIAGNOSTIC PROCESSING DEVICE AND COMPUTER-AIDED IMAGE DIAGNOSTIC PROCESSING PROGRAM PRODUCT

(75) Inventors: Hitoshi Yamagata, Otawara (JP); Sumiaki Matsumoto, Kobe (JP); Yoshiharu Ohno, Kobe (JP)

(73) Assignees: National University Corporation Kobe University, Kobe-shi (JP); Toshiba Mesical Systems Corporation, Otawara-shi (JP)

( * ) Notice: Subject to any disclaimer, the term of this patent is extended or adjusted under 35 U.S.C. 154(b) by 939 days.

(21) Appl. No.: 11/758,907

(22) Filed: Jun. 6, 2007

(65) Prior Publication Data
US 2007/0286469 A1    Dec. 13, 2007

(30) Foreign Application Priority Data
Jun. 8, 2006  (JP) ................................. 2006-159423

(51) Int. Cl.
    *G06K 9/00*   (2006.01)
    *A61B 6/00*   (2006.01)

(52) U.S. Cl. ........................... 382/132; 382/154; 378/21

(58) Field of Classification Search .................. 382/100, 382/128, 129, 130, 131, 132, 133, 134, 154, 382/168, 181, 189, 203, 224, 232, 255, 260, 382/274, 276, 285, 305, 312; 707/102; 600/425; 378/4, 21
See application file for complete search history.

(56) References Cited

U.S. PATENT DOCUMENTS

| | | | | |
|---|---|---|---|---|
| 5,807,256 A | * | 9/1998 | Taguchi et al. | 600/425 |
| 7,072,501 B2 | * | 7/2006 | Wood et al. | 382/132 |
| 7,349,563 B2 | * | 3/2008 | Kiraly et al. | 382/128 |
| 7,492,933 B2 | * | 2/2009 | Krishnan | 382/128 |
| 2005/0102315 A1 | * | 5/2005 | Krishnan | 707/102 |
| 2005/0207630 A1 | * | 9/2005 | Chan et al. | 382/131 |

OTHER PUBLICATIONS

Sumiaki Matsumoto, et al., "Diminution index: A novel 3D feature for pulmonary nodule detection", International Congress Series, vol. 1281, XP-005081826, May 1, 2005, pp. 1093-1098.
R. Wiemker, et al., "Aspects of computer-aided detection (CAD) and volumetry of pulmonary nodules using multislice CT" The British Journal of Radiology, vol. 78, No. 1, XP-002524095, Jan. 1, 2005, pp. S46-S56.
Masahito Aoyama, et al., "Computerized scheme for determination of the likelihood measure of malignancy for pulmonary nodules on low-dose CT images", Med. Phys., vol. 30, No. 3, XP-012012009, Mar. 1, 2003, pp. 387-394.
U.S. Appl. No. 11/736,865, filed Apr. 18, 2007, Sumiaki Matsumoto, et al.
Siddharth Manay, et al., "Anti-Geometric Diffusion for Adaptive Thresholding and Fast Segmentation", IEEE Transactions on Image Processing, vol. 12, No. 11, Nov. 2003, pp. 1310-1323.
Lawrence H. Staib, et al., "Model-Based Deformable Surface Finding for Medical Images", IEEE Transactions on Medical Imaging, vol. 15, No. 5, Oct. 1996, pp. 720-731.
David S. Paik, et al., "Surface Normal Overlap: A Computer-Aided Detection Algorithm With Application to Colonic Polyps and Lung Nodules in Helical CT", IEEE Transactions on Medical Imaging, vol. 23, No. 6, ISSN 0278-0062, Jun. 2004, pp. 661-675 and 2 cover pages.
U.S. Appl. No. 12/015,107, filed Jan. 16, 2008, Yamagata, et al.
U.S. Appl. No. 12/187,866, filed Aug. 7, 2008, Yamagata, et al.
U.S. Appl. No. 12/407,087, filed Mar. 19, 2009, Matsumoto et al.

* cited by examiner

*Primary Examiner* — Seyed Azarian
(74) *Attorney, Agent, or Firm* — Oblon, Spivak, McClelland, Maier & Neustadt, L.L.P.

(57) ABSTRACT

A computer-aided image diagnostic processing apparatus includes a storage unit which stores a medical image representing the inside of a subject, a unit which specifies an anatomical abnormality candidate region included in the medical image, and a generation unit which generates a display image representing the abnormality candidate region and its peripheral region to be discriminable from each other based on the medical image.

8 Claims, 26 Drawing Sheets

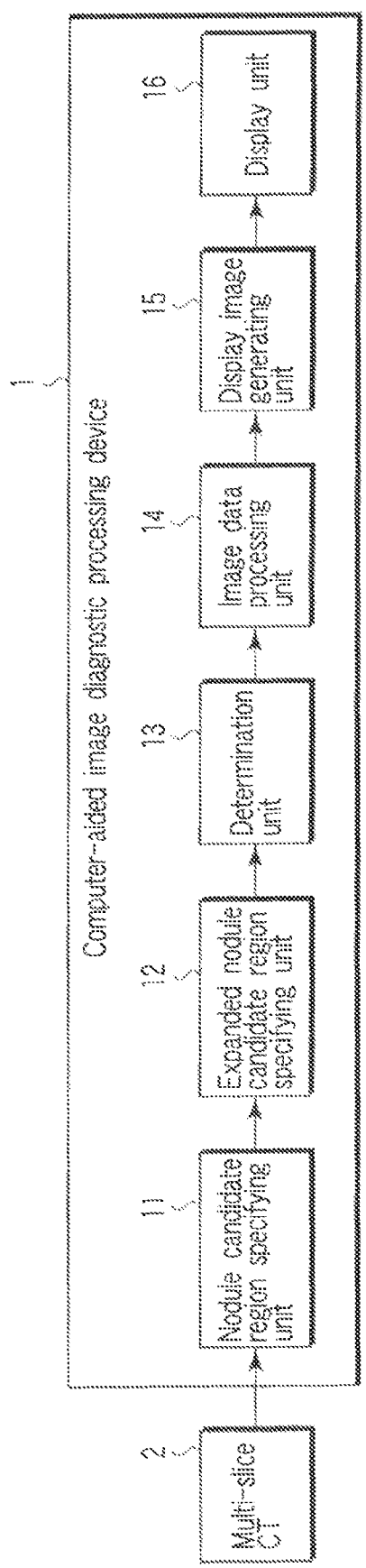
F I G. 1

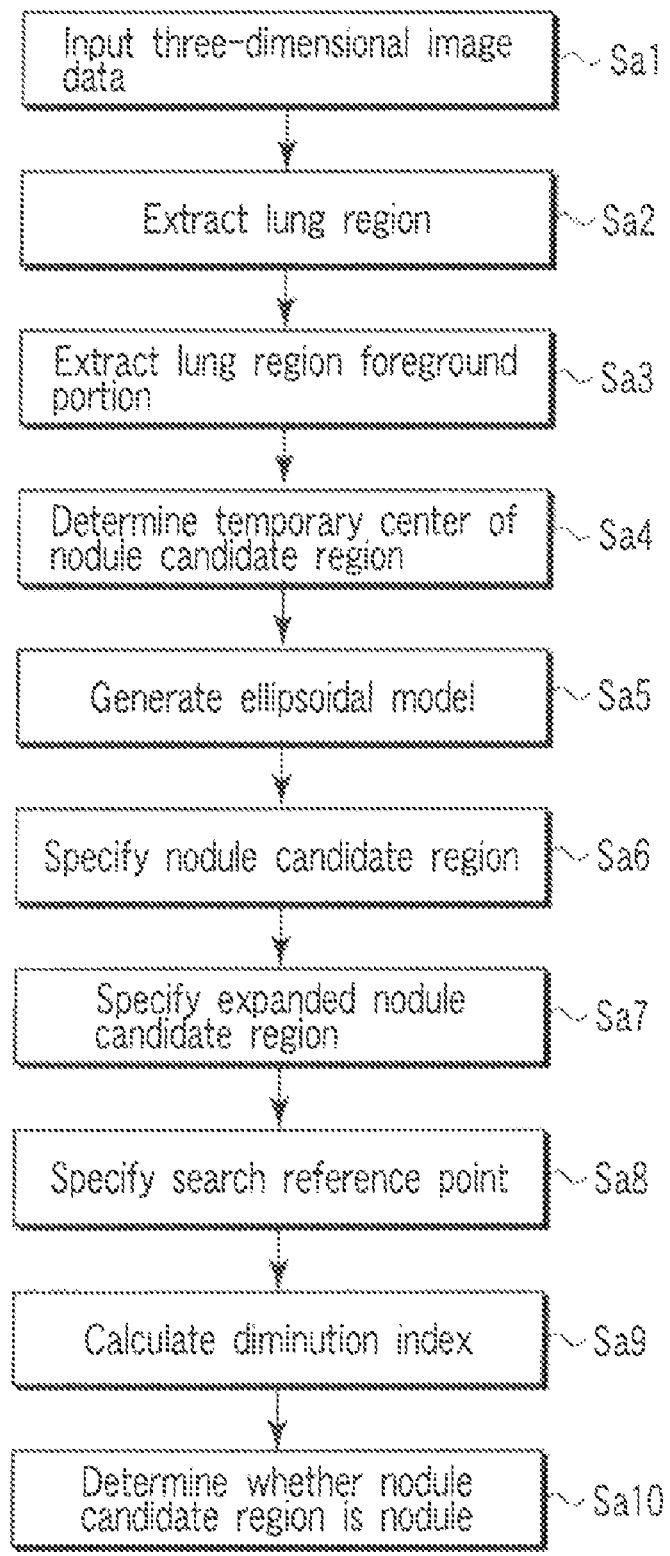
F I G. 2

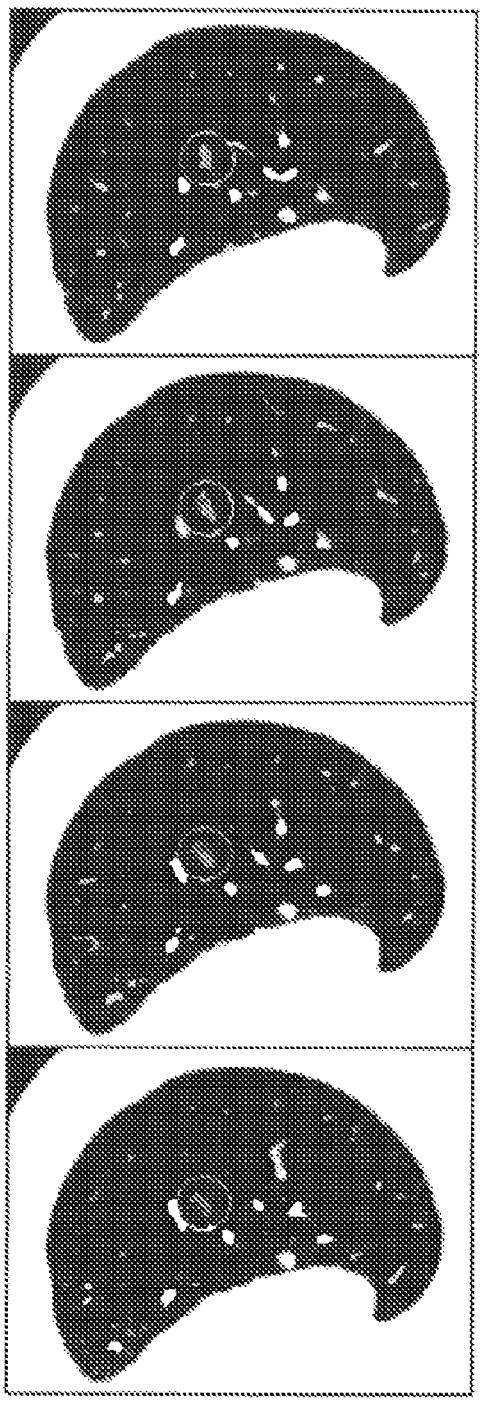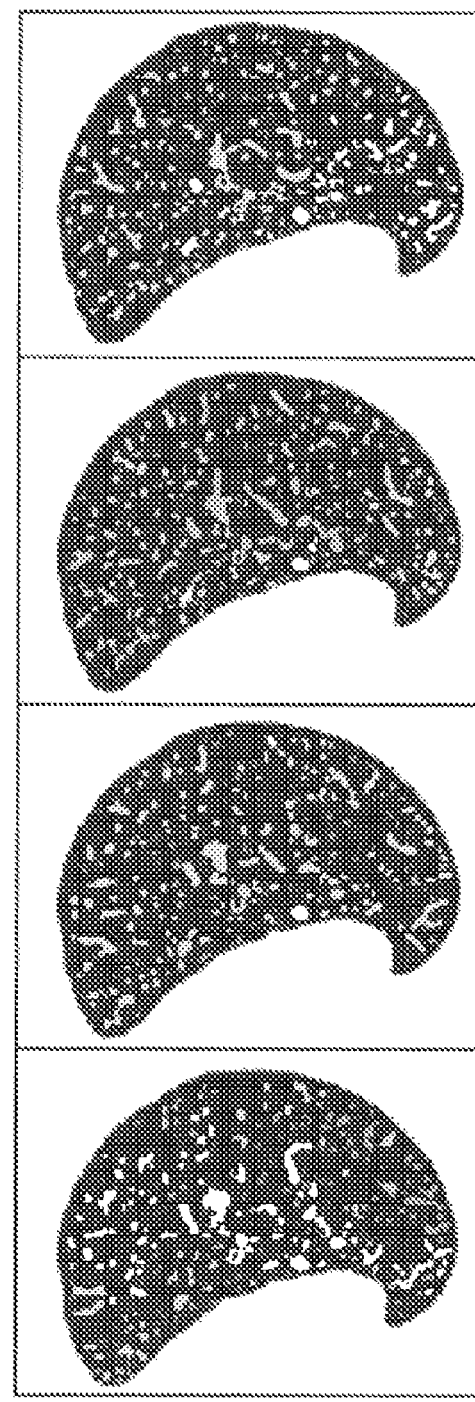
F I G. 3A
F I G. 3B

| -0.2 | -0.2 | 0.1 | 0.1 | 0.2 | 0 | -0.1 |
|---|---|---|---|---|---|---|
| -0.2 | -0.1 | -1.5 | -1.2 | -0 | -0.5 | -0.1 |
| -0.4 | -0.9 | -0.2 | 0.3 | 0.2 | -1.3 | -1 |
| -1.5 | 0.1 | 0.3 | 0.3 | 0.3 | 0 | -1.1 |
| -0.9 | -1.2 | 0.1 | 0.2 | -0.1 | -0.9 | -0.2 |
| -0.1 | -0.4 | 0.1 | -0.1 | -0.3 | -0.4 | -0.2 |
| 0 | -0.1 | -0.8 | -1.4 | -0.6 | 0.1 | 0 |

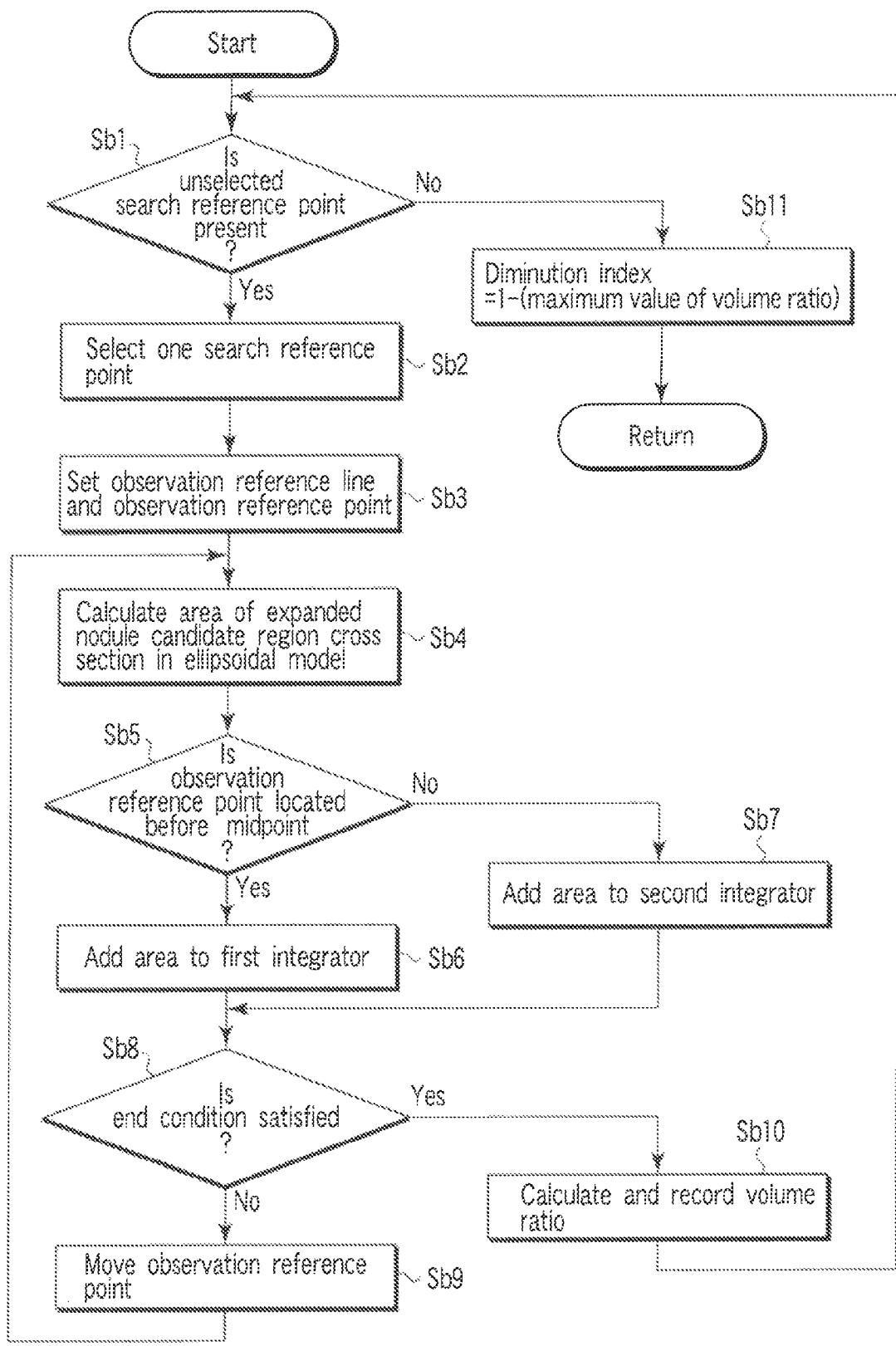
F I G. 10

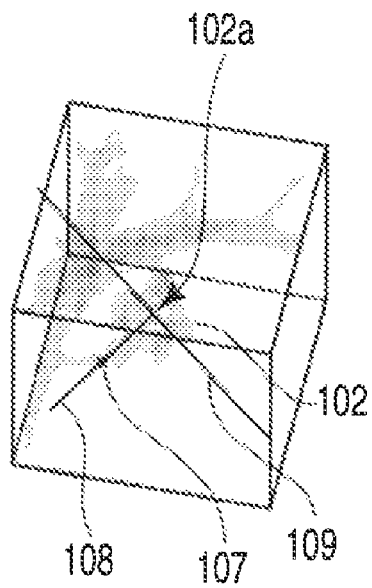 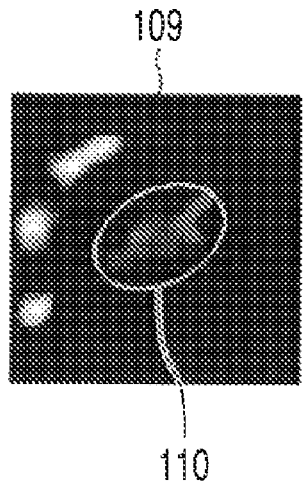 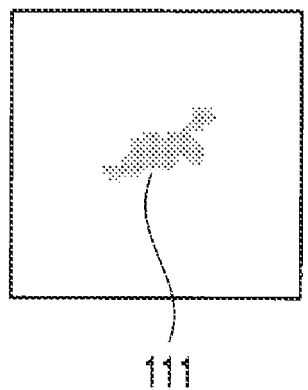
FIG. 11A    FIG. 11B    FIG. 11C
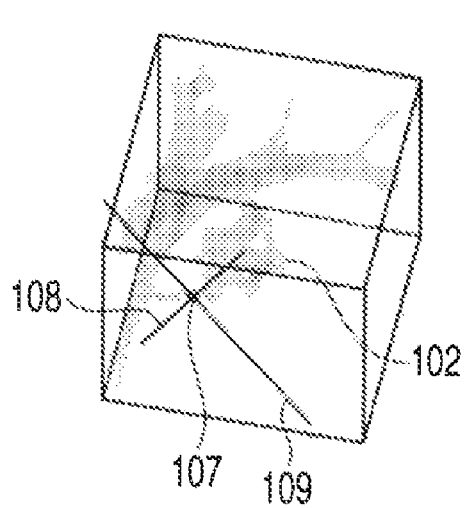 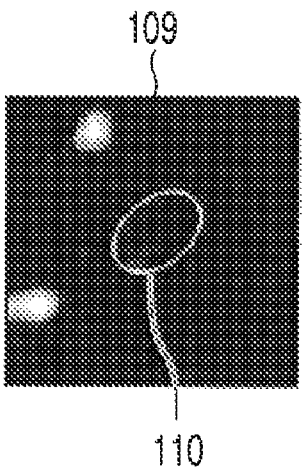 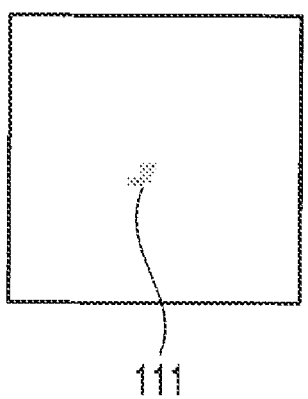
FIG. 12A    FIG. 12B    FIG. 12C

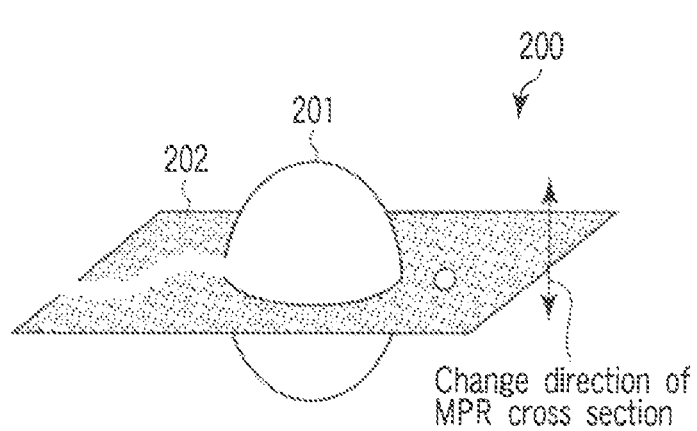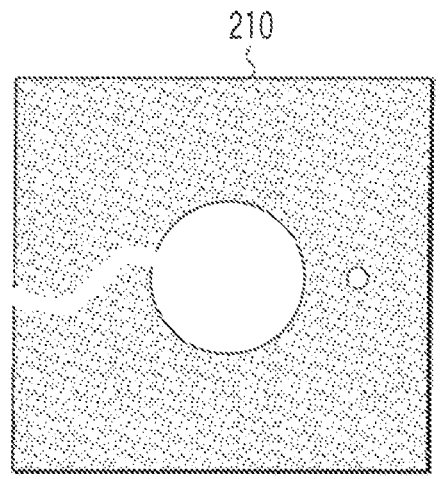
F I G. 17A　　　　　　　　F I G. 17B
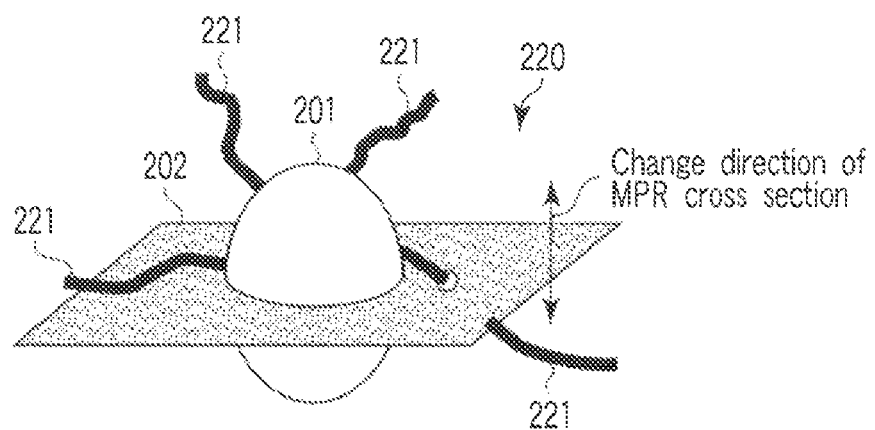
F I G. 18

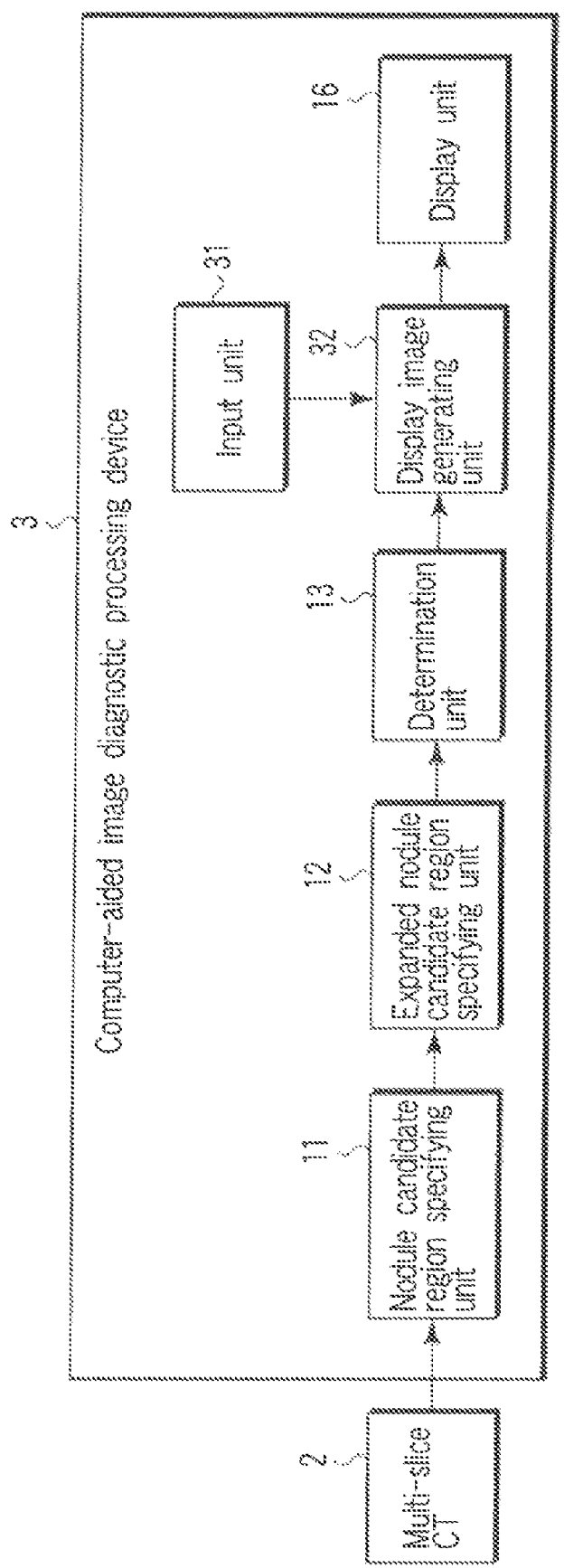
F I G. 23

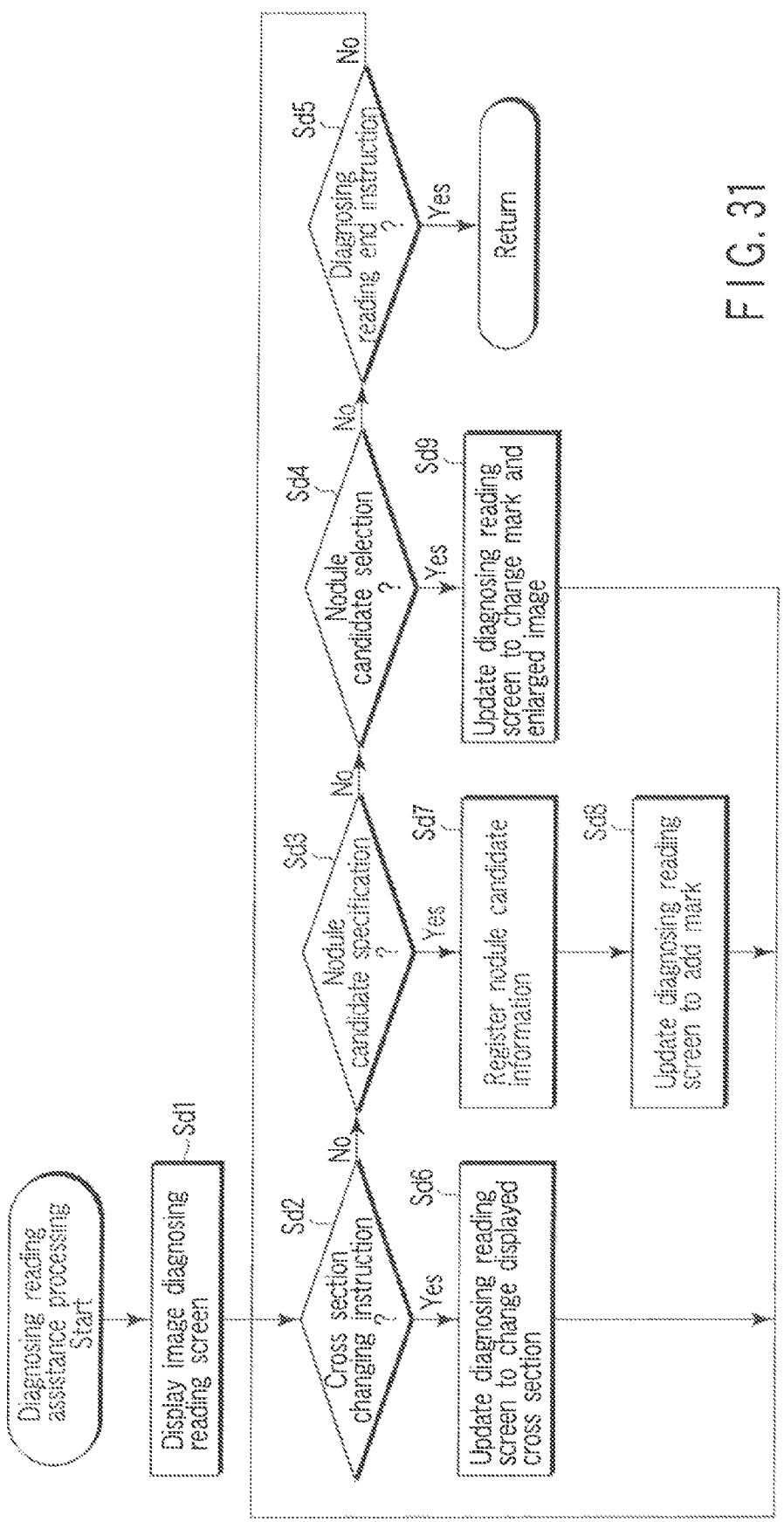
F I G. 31

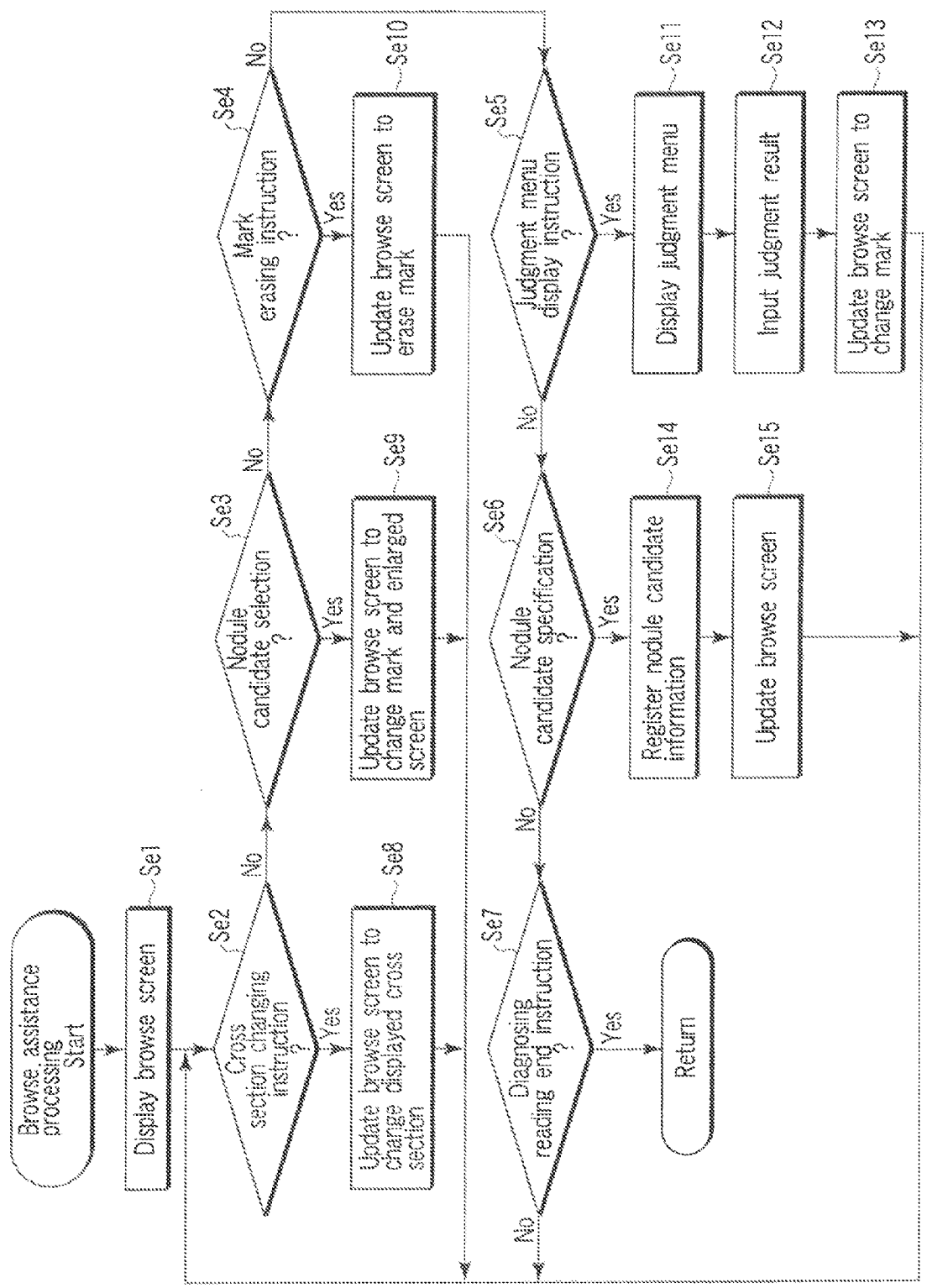
F I G. 33

COMPUTER-AIDED IMAGE DIAGNOSTIC PROCESSING DEVICE AND COMPUTER-AIDED IMAGE DIAGNOSTIC PROCESSING PROGRAM PRODUCT

CROSS-REFERENCE TO RELATED APPLICATIONS

This application is based upon and claims the benefit of priority from prior Japanese Patent Application No. 2006-159423, filed Jun. 8, 2006, the entire contents of which are incorporated herein by reference.

BACKGROUND OF THE INVENTION

1. Field of the Invention

The present invention relates to a computer-aided image diagnostic processing device and a computer-aided image diagnostic processing program product that assist a diagnosis of an anatomic abnormality, e.g., a nodular abnormality or a wen abnormality, based on a three-dimensional image collected by using a medical diagnostic imaging modality, e.g., an X-ray computer tomographic apparatus, an X-ray diagnostic apparatus, a magnetic resonance diagnostic apparatus, or an ultrasonic diagnostic apparatus.

2. Description of the Related Art

At the present day, a lung cancer heads a list of malignant deaths and goes on increasing in Japan.

Therefore, a social demand for early detection is strong with respect to the lung cancer like precaution as a countermeasure for smoking. In each municipalities in Japan, a lung cancer examination based on a chest plain radiograph and a sputum cytodiagnosis is carried out. However, a report "Study Group Concerning Cancer Examination Effectiveness Evaluation" issued from Health and Welfare Ministry in Japan in 1998 concludes that a current lung cancer examination has effectiveness but it is small. An X-ray computer tomography (which will be referred to as a CT hereinafter) can readily detect a lung field type lung cancer as compared with a chest plain radiograph, but it was not able to be used for examination since its imaging time is long before 1990 when a helical scanning type CT (helical CT) appeared. However, soon after the helical CT appeared, a method of using a relatively low X-ray tube current to perform imaging for a reduction in radiation exposure (which will be referred to as a low-dose helical CT hereinafter) was developed, and a pilot study of a lung cancer examination using this method was carried out in Japan and the United States. As a result, a fact that the low-dose helical CT has a lung cancer detection rate greatly higher than that of the chest plain radiograph was proved.

On the other hand, a time required for imaging by the helical CT is kept being reduced due to an increase CT detectors after 1998. The latest multi-detector helical CT, an entire lung can be imaged in 10 seconds with a substantially isotropic resolution that is less than 1 mm. Such a CT technology innovation develops a potentiality of enabling detection of a lung cancer when it is smaller. However, the multi-detector helical CT also has a problem of considerably increasing a burden on diagnosing reading since it generates several-hundreds images per scanning operation.

Based on such a background, it is widely recognized that a computer assisted diagnosis (which will be referred to as a CAD hereinafter) using a computer to avoid an oversight of a lung cancer is required for the low-dose helical CT to be established as a lung cancer examination method.

Since a small lung cancer in a lung field appears as a nodular abnormality in a CT image, automatic detection of such an abnormality is an important theme, and various studies have been conducted since the 1990's (see, e.g., "David S. Paik and seven others, "Surface Normal Overlap: A Computer-aided Detection Algorithm with Application to Colonic Polyps and Lung Nodules in Helical CT", IEEE Transactions on Medical Imaging, Vol. 23, No. 6, June 2004, pp. 661-675").

Automatic detection of a pulmonary nodule in a CT image takes an approach of extracting a region as a candidate for a nodule (which will be referred to as a nodule candidate region hereinafter) by any method, obtaining a plurality of characteristic amounts characterizing this nodule candidate region, and determining whether the nodule candidate region is a nodule based on these characteristic amounts. However, since characteristics of a nodule are similar to those of a part of a lung blood vessel, the nodule and the lung blood vessel cannot be accurately discriminated from each other based on characteristic amounts charactering the nodule candidate region in some cases.

Under such circumstances, a final judgment on whether the nodule candidate region is a nodule is still committed to medical doctors. Usually, this judgment is made based on observation of an image showing a cross section. However, in this method, since a three-dimensional shape cannot be immediately grasped, discriminating the nodule from the lung blood vessel takes time in some cases, and it cannot be said that an efficiency of the judgment is necessarily good.

BRIEF SUMMARY OF THE INVENTION

Under the circumstances, there has been a demand for enabling a medical doctor to judge whether an abnormality candidate region included in an image showing the inside of a subject is an anatomic abnormality like a nodule is demanded.

According to a first aspect of the present invention, there is provided a computer-aided image diagnostic processing apparatus comprising:

a storage unit which stores a medical image representing the inside of a subject; a unit which specifies an anatomical abnormality candidate region included in the medical image; and a generation unit which generates a display image representing the abnormality candidate region and its peripheral region to be discriminable from each other based on the medical image.

According to a second aspect of the present invention, there is provided a computer-aided image diagnostic processing apparatus comprising:

a storage unit which stores a medical image representing the inside of a subject; a unit which specifies an anatomical abnormality candidate region included in the medical image; a generation unit which generates a display image that represents a position of the abnormality candidate region in an image representing the inside of the subject; an input unit which inputs a specification of a position of an anatomical abnormality carried out in regard to the display image; and a unit which manages the position input through the input unit as a position of the anatomical abnormality.

According to a third aspect of the present invention, there is provided a medical diagnostic imaging assistance program product that enables a computer to function as: a unit which specifies an anatomical abnormality candidate region included in a medical image representing the inside of a subject; and a generation unit which generates a display image representing the abnormality candidate region and its peripheral region to be discriminable from each other based on the medical image.

According to a fourth aspect of the present invention, there is provided a medical diagnostic imaging assistance program product that enables a computer to function as: a unit which specifies an anatomical abnormality candidate region included in a medical image representing the inside of a subject; a generation unit which generates a display image showing a position of the anatomical abnormality candidate region included in the medical image in an image representing the inside of the subject; an input unit which inputs a specification of a position of an anatomical abnormality performed in regard to the display image; and a unit which manages the position input through the input unit as the position of the anatomical abnormality.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a view showing a structure of a computer-aided image diagnostic processing device according to a first embodiment of the present invention;

FIG. 2 is a flowchart showing an outline of processing of detecting a nodule in the computer-aided image diagnostic processing device depicted in FIG. 1;

FIGS. 3A and 3B are views of images shown by three-dimensional image data acquired by a multi-slice CT depicted in FIG. 1 and images of a foreground portion divided from these images;

FIG. 10 is a flowchart of processing carried out by a determination unit in FIG. 1 to calculate a diminution index;

FIGS. 11A, 11B, and 11C are views showing how a expanded nodule candidate region is searched;

FIGS. 12A, 12B, and 12C are views showing how the expanded nodule candidate region is searched;

FIGS. 17A and 17B are views showing a display image concerning a first display image example according to the first embodiment;

FIG. 18 is a view showing a display image concerning a second display image example according to the first embodiment;

FIG. 23 is a view showing a structure of a computer-aided image diagnostic processing device 3 according to a second embodiment;

FIG. 31 is a flowchart of diagnosing reading assistance processing;

FIG. 33 is a flowchart of browse assistance processing;

DETAILED DESCRIPTION OF THE INVENTION

Figure 4A:
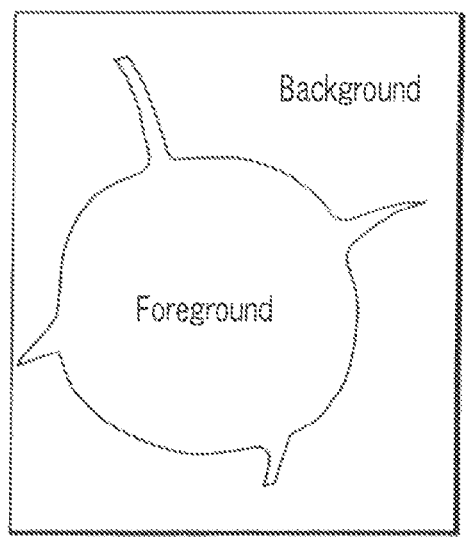
FIGS. 4A, 4B, and 4C are views for explaining ellipsoidal model generation processing.

Embodiments according to the present invention will now be explained hereinafter with reference to the accompanying drawings.

First Embodiment

FIG. 1 is a view showing a structure of a computer-aided image diagnostic processing device 1 according to a first embodiment.

The computer-aided image diagnostic processing device 1 depicted in FIG. 1 is intended to process three-dimensional data acquired by a multi-slice CT 2. As shown in FIG. 1, the computer-aided image diagnostic processing device 1 includes a nodule candidate region specifying unit 11, a expanded nodule candidate region specifying unit 12, a determination unit 13, an image data processing unit 14, a display image generating unit 15, and a display unit 16.

The computer-aided image diagnostic processing device 1 can use, e.g., a general-purpose computer device as basic hardware. Further, the nodule candidate region specifying unit 11, the expanded nodule candidate region specifying unit 12, the determination unit 13, the image data processing unit 14, and the display image generating unit 15 can be realized when a processor mounted on the computer device executes a medical diagnostic imaging assistance program. In this example, the computer-aided image diagnostic processing device 1 may be realized by previously installing the medical diagnostic imaging assistance program in the computer device, or may be realized by recording the medical diagnostic imaging assistance program in a removable recording medium, e.g., a magnetic disk, a magneto-optical disk, an optical disk, or a semiconductor memory, or by distributing the medical diagnostic imaging assistance program through a network to be installed in the computer device. It is to be noted that all or some of the respective sections can be also realized by hardware, e.g., a logic circuit. Furthermore, each of these sections can be also realized by combining hardware with software control.

The nodule candidate region specifying unit 11 specifies a region that can be a nodule (which will be referred to as a nodule candidate region hereinafter) in an image represented by three-dimensional image data as a processing target. The expanded nodule candidate region specifying unit 12 specifies a expanded nodule candidate region in a processing target image. The expanded nodule candidate region includes the nodule candidate region and a peripheral region that is continuous with the nodule candidate region. The determination unit 13 determines whether the nodule candidate region is a nodule based on characteristic amounts of the nodule candidate region and the peripheral region. The image data processing unit 14 analyzes characteristics of each of the nodule candidate region and the peripheral region. The display image generating unit 15 generates a display image to be provided for diagnosing reading by a medical doctor based on characteristics analyzed by the image data processing unit 14 and the three-dimensional image data acquired by the multi-slice CT 2. The display unit 16 displays the display image. As the display unit 16, a display device, e.g., a CRT, can be utilized. The display unit 16 may be externally installed instead of being built in the computer-aided image diagnostic processing device 1.

A description will now be given of an operation of the computer-aided image diagnostic processing device 1 having the above structure.

(Specification of Nodule Candidate Region and Peripheral Region)

First, the computer-aided image diagnostic processing device 1 utilizes a technique proposed as JP-A 2006-239005 to specify a nodule candidate region and a peripheral region as follows.

FIG. 2 is a flowchart showing an outline of processing of detecting a nodule in the computer-aided image diagnostic processing device 1.

Steps Sa1 to Sa6 are processing by the nodule candidate region specifying unit 11. Step Sa7 is processing by the expanded nodule candidate region specifying unit 12. Steps Sa8 to Sa10 are processing by the determination unit 13.

First, the multi-slice CT 2 images an entire chest region including a lung of a subject as a diagnostic target.

At step Sa1, the nodule candidate region specifying unit 11 inputs and stores three-dimensional image data acquired by the multi-slice CT 2 based on the above-explained imaging.

At step Sa2, the nodule candidate region specifying unit 11 obtains a region corresponding to the lung by segmenting a processing target image represented by the three-dimensional image data. For example, an existing method can be utilized for this processing. This existing method is typically a method disclosed in "Hu S, Hoffman E. A., Reinhardt J. M. Automatic Lung Segmentation for Accurate Quantitation of Volumetric X-ray CT images. IEEE Trans Med Imaging 2001; 20:490-498".

At step Sa3, the nodule candidate region specifying unit 11 divides the lung region obtained at step Sa2 into a foreground portion corresponding to a lung blood vessel and a nodule and a background part corresponding to other regions. For example, existing adaptive threshold processing can be applied for this processing. This adaptive threshold processing is typically a method disclosed in "Manay S., Yezzi A. Antigeometric Diffusion for Adaptive Thresholding and Fast Segmentation. IEEE Trans-Image Processing 2003; 12:1310-1323". FIG. 3A is a view showing processing target images acquired by the multi-slice CT 2. FIG. 3B is a view showing images of the foreground portion divided from the processing target images depicted in FIG. 3A. It is to be noted that a nodule is present in a circle shown in FIG. 3A. Moreover, a black area in FIG. 3B corresponds to a lung region, and a white region in this lung region represents the foreground portion of the lung region.

Figure 4B:
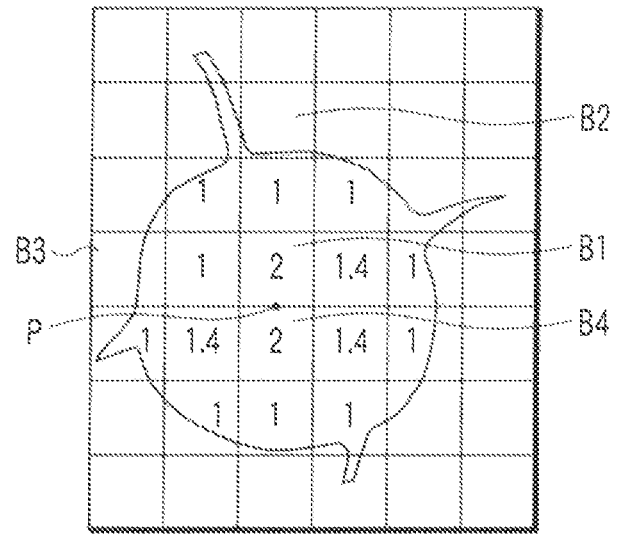

At step Sa4, the nodule candidate region specifying unit 11 determines a temporary center that can be a center of the nodule candidate region. First, the nodule candidate region specifying unit 11 converts a value of each voxel belonging to the foreground portion into a value corresponding to a minimum distance from each voxel to a voxel belonging to the background part. For example, paying attention to a region including the foreground portion having such a shape as shown in FIG. 4A, a voxel B1 depicted in FIG. 4B belongs to the foregoing part. Additionally, voxels B2 and B3 belong to the background part and are closest to the voxel B1. A distance between the voxel B1 and the voxel B2 or B3 (a distance between central points) corresponds to two voxels. Thus, a value of the voxel B1 is determined as "2" as shown in FIG. 4B. Consequently, as shown in FIG. 4B, an image is basically converted into an image that has a larger value as getting closer to the inner side of the foreground portion. Further, the nodule candidate region specifying unit 11 determines a point whose value after distance conversion becomes maximum as a temporary center. When the number of the voxel having the maximum value is one, the temporary center is a voxel point of this voxel. When the number of the voxels having the maximum value is two or more, the temporary center is a center of gravity of voxel points of these voxels. For example, in FIG. 4B, both the voxel B1 and a voxel B4 have the maximum value, a center of gravity (an intermediate point) P of voxel points of these voxels B1 and B4 is the temporary center. It is to be noted that a plurality of foreground regions that can be nodules are present in an image of the lung region. The nodule candidate region specifying unit 11 determines a temporary center of each of the plurality of regions.

Although subsequent processing is carried out with respect to the plurality of temporary centers, the processing is the same, and hence processing with respect to the single temporary center alone will be explained hereinafter.

Figure 4C:
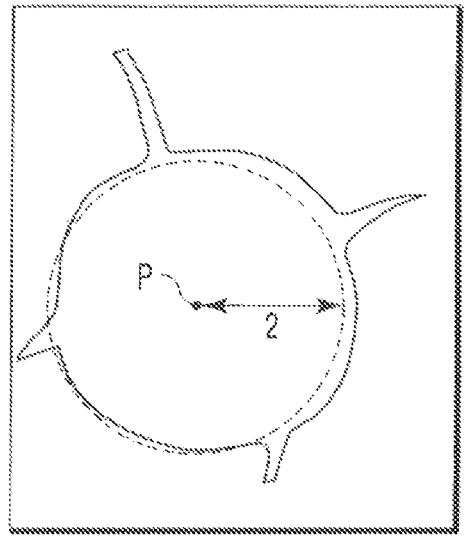

At step Sa5, the nodule candidate region specifying unit 11 generates an ellipsoidal model having an intrinsic temporary center. Specifically, the nodule candidate region specifying unit 11 first prepares an ellipsoidal model initialized as a sphere having the temporary center as its center and a maximal value after distance conversion as a radius. FIG. 4C is a view showing an ellipsoidal model with respect to a temporary center P determined as shown in FIG. 4B. In FIG. 4C, a broken line indicates a cross section of the ellipsoidal model. Further, the nodule candidate region specifying unit 11 deforms this ellipsoidal model based on information included in an image. The ellipsoidal model can be deformed in accordance with, e.g., an existing method. This method is typically a method disclosed in "Staib L. H., Duncan J. S. Model-based Deformable Surface Finding for Medical Images. IEEE Trans-Med Imaging 1996; 15:720-731". This method concerns deformation of a Fourier curved surface in a general three-dimensional image. It is to be noted that the ellipsoidal is the simplest Fourier closed surface. Deformation of the ellipsoidal model based on the above-explained method is carried out in such a manner that a supplied three-dimensional image having a negative sign to a magnitude of a intensity gradient of thereof is determined as a penalty image and integration of a value of this penalty image on a Fourier curved surface is minimized. However, in this example, as an improvement in the above-explained method, an image obtained by adding a target three-dimensional image having a negative sign to a magnitude of a intensity gradient thereto to an absolute value of convolution of the target three-dimensional image and a Laplacian-of-Gaussian (LoG) filter is determined as the penalty image. The LoG filter performs one kind of secondary differentiation. On the other hand, the intensity gradient is obtained by a primary differentiation filter. Therefore, it can be said that the penalty image used in this example is obtained by combining a primary differentiation filter processing result of a target three-dimensional image with a secondary differentiation filter processing of the same.

A combination process of the penalty image will now be explained in detailed with reference to FIG. 5. In order to one-dimensionally exemplify this combination process, it is determined that a fluctuation in a intensity along a straight line running through a nodule is represented as shown in a graph G1. It is to be noted that a peak at a central part in the graph G1 corresponds to the nodule. A result of convoluting the LoG filter showing a shape as a graph G2 in the graph G1 and an absolute value thereof are as shown in graphs G3 and G4. On the other hand, when a negative sign is given to a magnitude of a gradient of a intensity fluctuation depicted in the graph G1, a graph G5 is obtained. Furthermore, when the graph G4 is combined with the graph G5, a graph G6 can be obtained. Comparing the graph G5 with the graph G6, the graph G6 has a clear valley at a position corresponding to a boundary of the nodule, and is suitable for use as a penalty value. It is to be noted that a broken line in FIG. 5 is a base line.

Figures 5, 6:
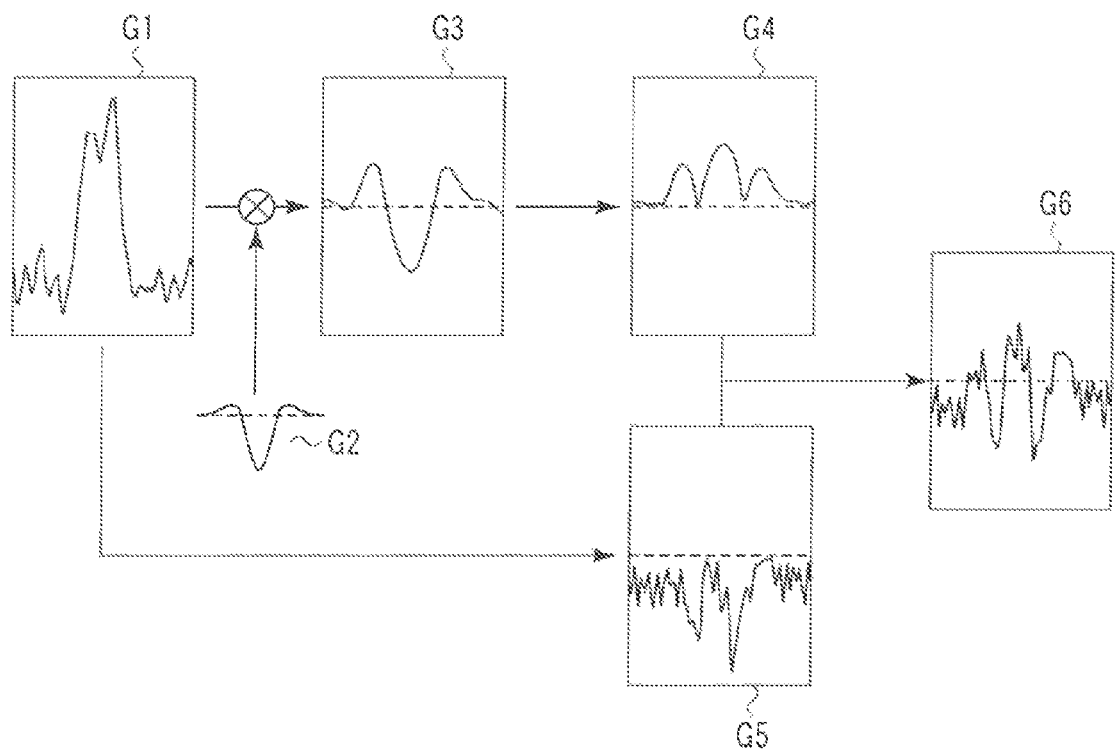
FIG. 5 is a view for explaining a penalty image synthesis process.
FIG. 6 is a view for explaining ellipsoidal model deformation processing.

Furthermore, as shown in FIG. 6, for example, the ellipsoidal model is deformed in such a manner that the ellipsoidal model becomes parallel with the valley of the penalty value in the penalty image.

Figure 7A:
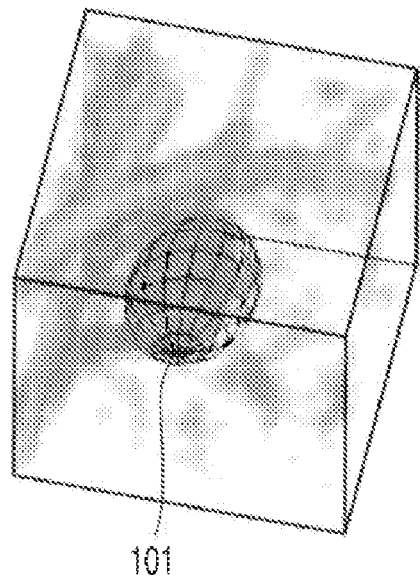
FIGS. 7A and 7B are views showing an ellipsoidal model after completion of deformation and a nodule candidate region specified by this ellipsoidal model.
Figure 7B:
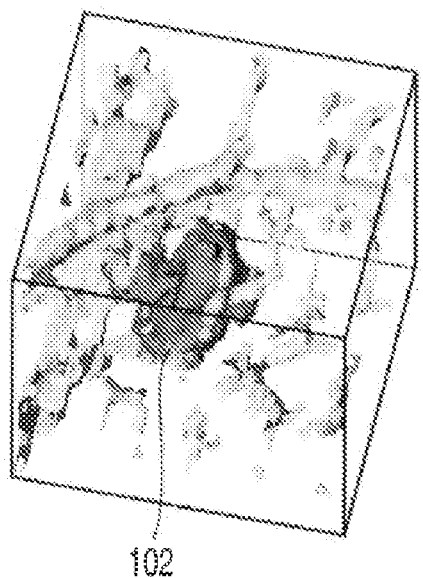

At step Sa6, the nodule candidate region specifying unit 11 specifies a nodule candidate region in the original processing target region that has not been subjected to distance conversion based on the deformed ellipsoidal model. That is, a set of voxels that are placed in the deformed ellipsoidal model and belong to the foreground portion of the lung region as a nodule candidate region. FIG. 7A is a view showing a deformed ellipsoidal model 101 superimposed on a nodule and semi-transparent display of a part of a processing target image corresponding to the vicinity thereof. A structure depicted in FIG. 7B corresponds to the nodule shown in FIG. 3A and the foreground portion of the lung region in the vicinity thereof, and a nodule candidate region 102 specified in the above-explained manner is represented in a relatively deep color tone.

It is to be noted that the deformed ellipsoidal model used for generation of the nodule candidate region will be referred to as a nodule candidate region generated ellipsoidal model hereinafter.

At step Sa7, the expanded nodule candidate region specifying unit 12 determines a expanded nodule candidate region corresponding to the nodule candidate region. The expanded nodule candidate region is a region corresponding to a structure that overlaps the nodule candidate region or a structure that is continuous with the nodule candidate region.

Specification of the expanded nodule candidate region will now be explained in detail with reference to FIG. 8. It is to be noted that the expanded nodule candidate region is three-dimensionally specified, but a specification process will be two-dimensionally exemplified to facilitate an explanation.

Figure 8A:
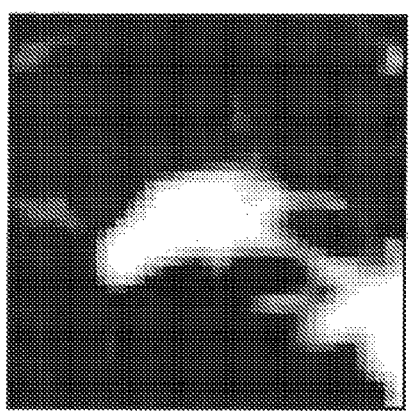
FIGS. 8A to 8F are views for explaining a specification of a expanded nodule candidate region.
Figure 8D:
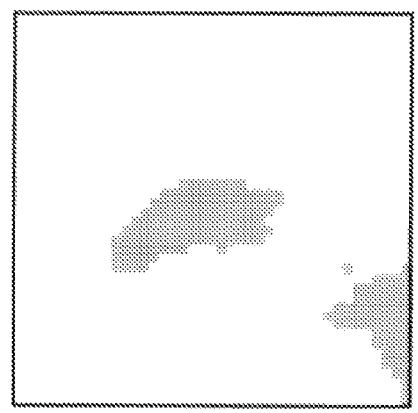
Figure 8B:
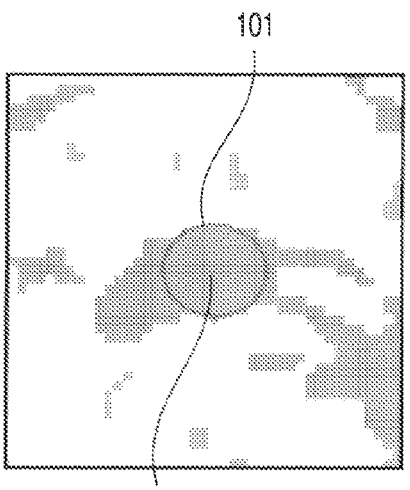

FIG. 8A shows a small region of a CT image. FIG. 8B shows a foreground portion of a lung region in this small region in gray and the foreground portion in white, and depicts one ellipse. The explanation will proceed on the assumption that this ellipse is an example of the nodule candidate region generated ellipsoidal model 101. Therefore, a gray region in a circle depicted in FIG. 8B corresponds to the nodule candidate region 102.

Figure 8E:
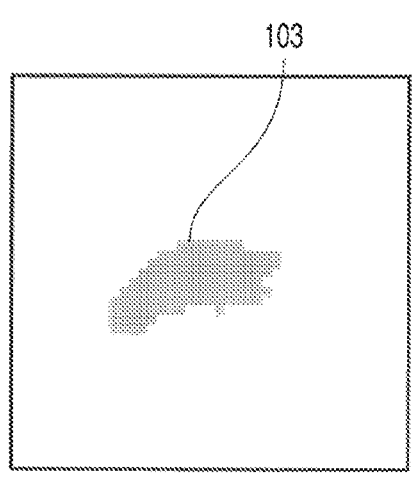
Figure 8C:
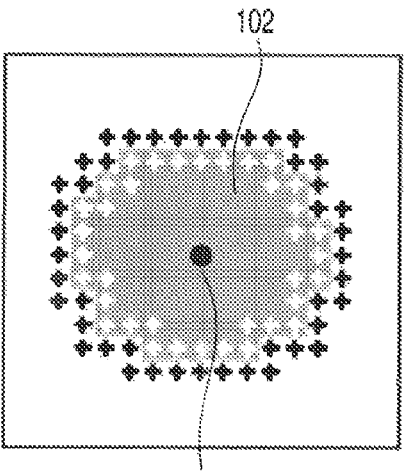
Figure 8F:
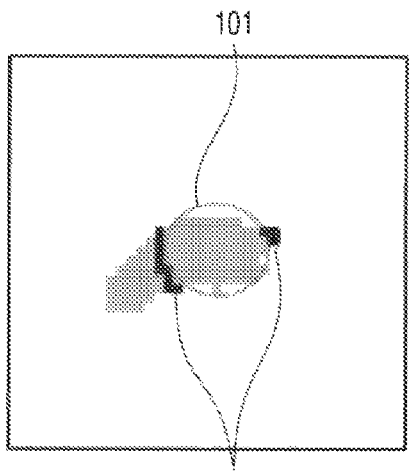

FIG. 8C shows the nodule candidate region 102 in an enlarged manner. A black circle in FIG. 8C is a center of gravity 102a of the nodule candidate region 102. Each voxel labeled indicated by a white cross in FIG. 8C is a voxel that belongs to the nodule candidate region 102 and is adjacent to a voxel that does not belong to the nodule candidate region 102. A region formed of voxels indicated by these white crosses is defined as an inner boundary of the nodule candidate region 102. Each voxel indicated by a black cross is a voxel that does not belong to the nodule candidate region 102 and is adjacent to a voxel belonging to the nodule candidate region 102. A region formed of voxels indicated by these black crosses is defined as an outer boundary of the nodule candidate region 102. Further, an average intensity of the voxels belonging to the inner boundary is defined as an inner boundary intensity concerning the nodule candidate region 102. Likewise, an average intensity of the voxels belonging to the outer boundary is defined as an outer boundary intensity concerning the nodule candidate region 102. The expanded nodule candidate region associated with the nodule candidate region 102 is obtained through threshold processing in which an weighted average of the inner boundary intensity and the outer boundary intensity (which will be referred to as an average boundary intensity hereinafter) is determined as a threshold value. This threshold processing first generates a three-dimensional alignment in which each voxel that demonstrates a intensity which is equal to or above an average boundary intensity and is placed within the lung region is determined as "1" and any other voxel is determined as "0" in a target three-dimensional image. Of linked components (which correspond to a set of voxels that have a value "1" and are linked with each other, and a part indicated in gray in FIG. 8D) in this three-dimensional alignment, components having voxels shared by the nodule candidate region 102 are defined as a expanded nodule candidate region 103 concerning the nodule candidate region 102 as shown in FIG. 8E. In this manner, the expanded nodule candidate region 103 is defined as a region formed of the nodule candidate region 102 and a peripheral region that is continuous with the nodule candidate region 102. Incidentally, of voxels that are placed outside the generated ellipsoidal model 101 (again exemplified as an ellipse in FIG. 8F) for the nodule candidate region 102, a region formed voxels adjacent to voxels placed in the generated ellipsoidal model 101 and a region common to the expanded nodule candidate region are defined as a expanded nodule candidate region critical portion 104 (a part shown in black in FIG. 8F).

Figure 9A:
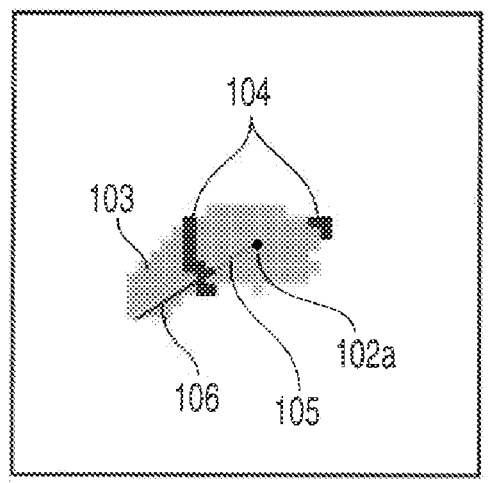
FIGS. 9A and 9B are views for explaining processing of generating a search reference point.
Figure 9B:
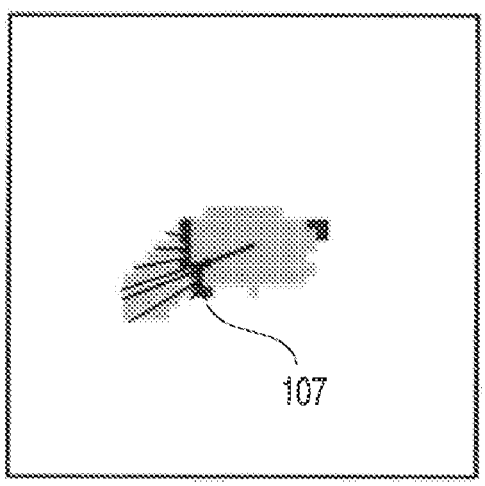

At step S8a, the determination unit 13 specifies a search reference point in the expanded nodule candidate region. The determination unit 13 generates a search reference point to be associated with linked components in the expanded nodule candidate region critical portion 104 in a one-on-one relationship. For example, the determination unit 13 generates the search reference point for the linked component on the left-hand side in FIG. 8F as follows. As shown in FIG. 9A, the determination unit 13 expands a line segment having each voxel belonging to the linked component as a starting point in a direction of a vector 105 (which will be referred to as a centrifugal vector hereinafter) reaching this voxel from a center of gravity 102a of the nodule candidate region 102 with respect to this voxel, and stops expansion when an end point of this line segment is out of the expanded nodule candidate region 103. It is to be noted that, if the end point is not placed in the lung region at this time, this voxel is not a target of consideration. The thus defined line segment is called a centrifugal directed line segment 106. The determination unit 13 selects the longest one from the plurality of centrifugal directed line segments 106 which are respectively defined with respect to the plurality of voxels as shown in FIG. 9B. Then, the determination unit 13 defines a position of the voxel which serves as a starting point of the selected centrifugal directed line segment 106 as a search reference point 107 associated with the linked component.

Figure 13:
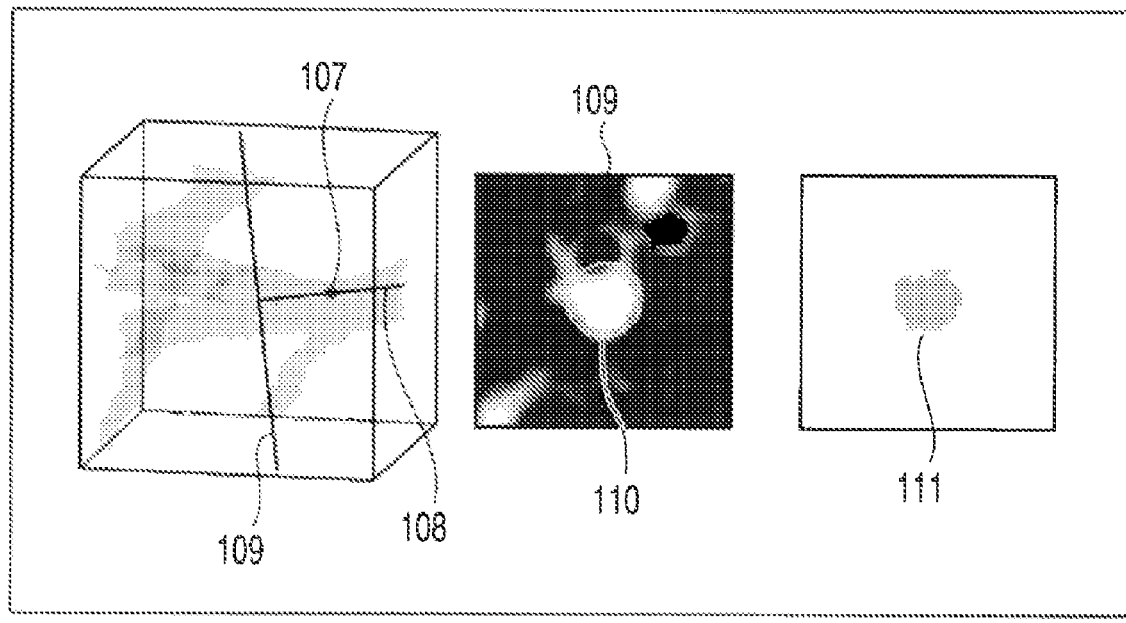
FIG. 13 is a view showing how the expanded nodule candidate region is searched.
Figure 14:
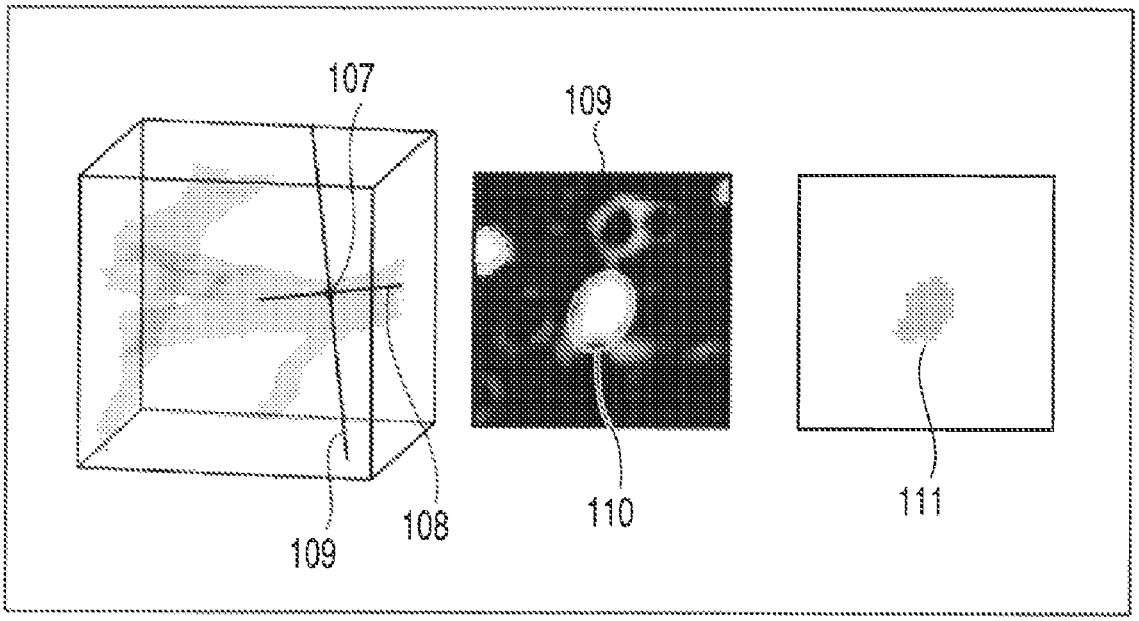
FIG. 14 is a view showing how the expanded nodule candidate region is searched.

At step Sa9, the determination unit 13 calculates a diminution index. FIG. 10 is a flowchart showing a processing procedure of a diminution index calculation carried out by the determination unit 13. The expanded nodule candidate region is searched in this processing, and FIGS. 11 to 14 show how a main operation in this search is carried out. It is to be noted that FIGS. 11 and 12 show an example where the nodule candidate region corresponds to a nodule and FIGS. 13 and 14 show an example where the nodule candidate region corresponds to a lung blood vessel.

At step Sb1, the determination unit 13 confirms whether an unselected search reference point 107 is present in a set of search reference points 107 obtained with respect to the expanded nodule candidate region 103.

If the unselected search reference point 107 is present, the determination unit 13 advances to step Sb2 from step Sb1. At step Sb2, the determination unit 13 selects one unselected search reference point 107 from the set of the search reference points 107.

At step Sb3, the determination unit 13 sets an observation reference line and an observation reference point based on the selected search reference point 107. As shown in FIG. 11A, the determination unit 13 sets a directed line segment having the center of gravity 102a of the nodule candidate region 102 as a starting point in such a manner that the selected search reference point 107 becomes a middle point of this line segment. Furthermore, this line segment is defined as an observation reference line 108. Moreover, the determination unit 13 sets an observation reference point on the center of gravity 102a. It is to be noted that the observation reference point is not fixed and moves between the starting point and the end point of the observation reference line as will be explained later.

At step Sb4, the determination unit 13 defines a plane that is perpendicular to the observation reference line 108 and runs through the observation reference point as an observation plane 109. Then, as shown in FIG. 11B, the determination unit 13 sets an ellipse model initialized as an ellipse given by a nodal line of the generated ellipsoidal model for the nodule candidate region and the observation plane within the observation plane. Subsequently, the determination unit 13 deforms the ellipse model in such a manner that line integral of a value of the penalty image used at step Sa3 on the ellipse model is minimized. Moreover, the determination unit 13 calculates an area of a part present in the deformed ellipse model in a cross section of the expanded nodule candidate region on the observation plane 109 (which will be referred to as a expanded nodule candidate region cross section in the ellipse model hereinafter). FIG. 11B shows the deformed ellipse model. FIG. 11C shows the expanded nodule candidate region cross section 111 in the ellipse model included in FIG. 11B.

At step Sb5, the determination unit 13 determines whether the current observation reference point is present before the middle point of the observation reference line 108 (before the search reference point 107).

If the current observation reference point is present before the middle point of the observation reference line 108, the determination unit 13 advances to step Sb6 from step Sb5. If not, the determination unit 13 advances to step Sb7 from step Sb5. At step Sb6, the determination unit 13 applies the thus calculated area of the expanded nodule candidate region cross section in the ellipse model to a first integrator. At step Sb7, the determination unit 13 applies the thus calculated area of the expanded nodule candidate region cross section in the ellipse model to a second integrator. It is to be noted that the first integrator and the second integrator are included in the determination unit 13. Additionally, the first integrator and the second integrator are initialized to zero at the time of start of the processing shown in FIG. 10.

At step Sb8, the determination unit 13 confirms whether end conditions are achieved. Here, the end conditions are the following four conditions.

(First End Condition)

The observation reference point has reached the end point of the observation reference line.

(Second End Condition)

The expanded nodule candidate region in the ellipse model is eliminated.

(Third End Condition)

Figure 15A:
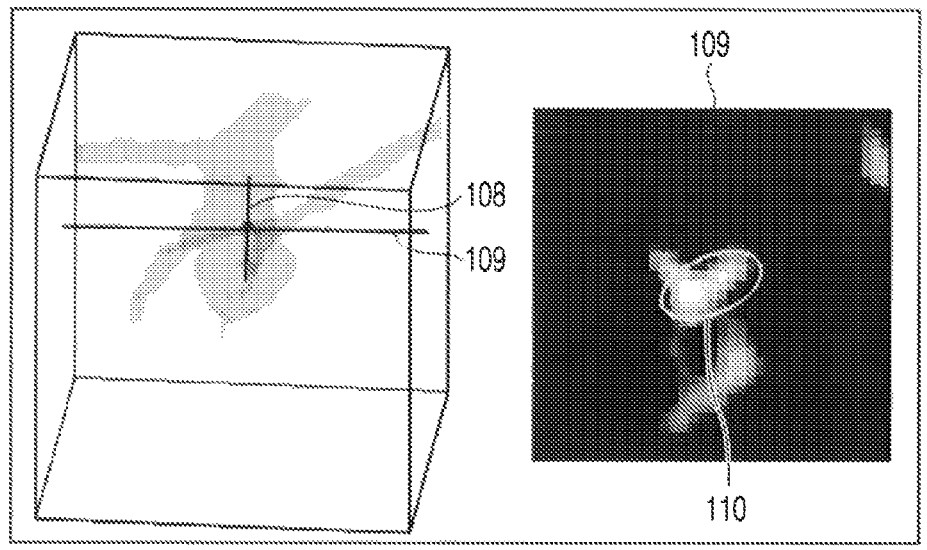
FIGS. 15A, 15B, and 15C are views for explaining a third end condition.
Figure 15B:
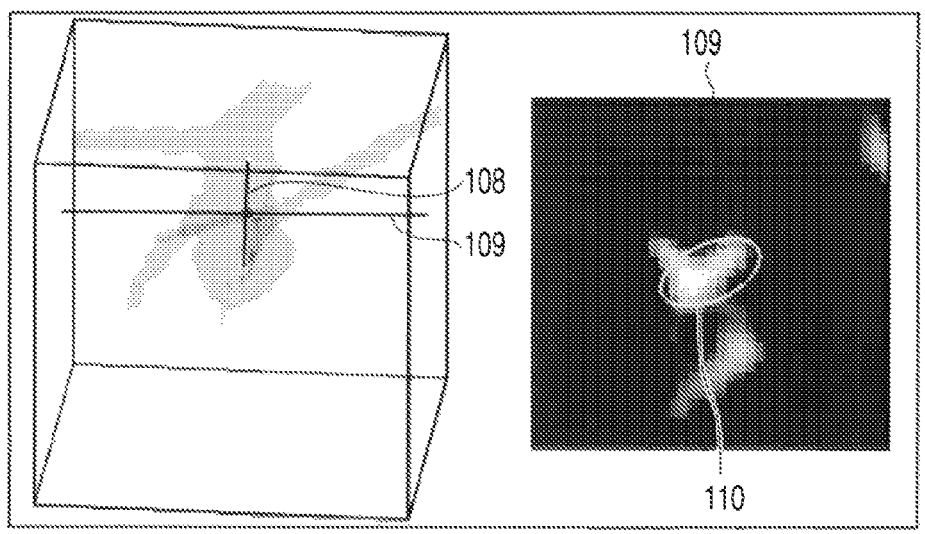
Figure 15C:
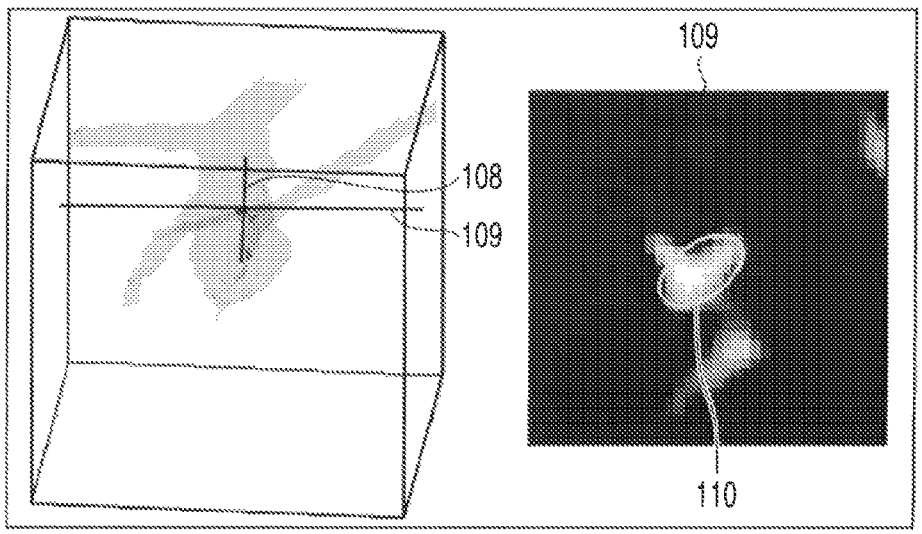

This will be explained with reference to FIGS. 15A, 15B, and 15C. FIGS. 15A, 15B, and 15C show how the deformed ellipse model undergoes a transition when the observation reference point moves along two gaps from FIG. 15A to FIG. 15B and from FIG. 15B to FIG. 15C near a peripheral part of a nodule that has adhered to a blood vessel. In a transition from FIG. 15B to FIG. 15C, a size of the ellipse model 110 precipitously varies. This occurs when a cross section of the nodule is no longer observed in the range of the ellipse modicule 110 at the peripheral part of the nodule that has adhered to the blood vessel, i.e., when a cross section of the blood vessel alone can be observed. Therefore, the subsequent search is meaningless, and hence occurrence of the above-explained state is determined as the end condition. Achievement of this end condition can be determined based on the following processing. At each position of the observation reference point, an ellipse model relative average displacement is calculated by dividing an average displacement of the ellipse model (a dot sequence along a circumference of the non-deformed ellipse model and a dot sequence along a circumference of the deformed ellipse model associated with the former sequence are considered, and the average displacement can be obtained as an average distance between associated points in the two dot sequences) by an average effective radius of the ellipse model (an average value of an effective radius of the non-deformed ellipse model and an effective radius of the deformed ellipse model). Additionally, if the ellipse model relative average displacement is larger than a preset upper limit value, it is determined that this end condition is achieved.

(Fourth End Condition)

Figure 16A:
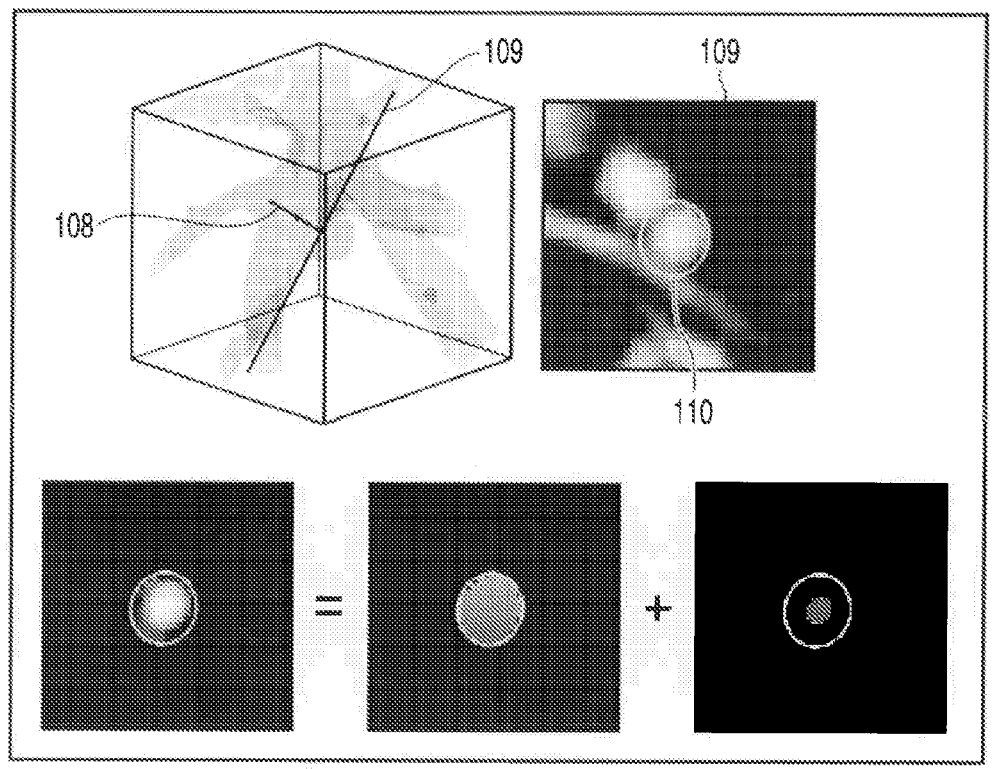
FIGS. 16A and 16B are views for explaining a fourth end condition.
Figure 16B:
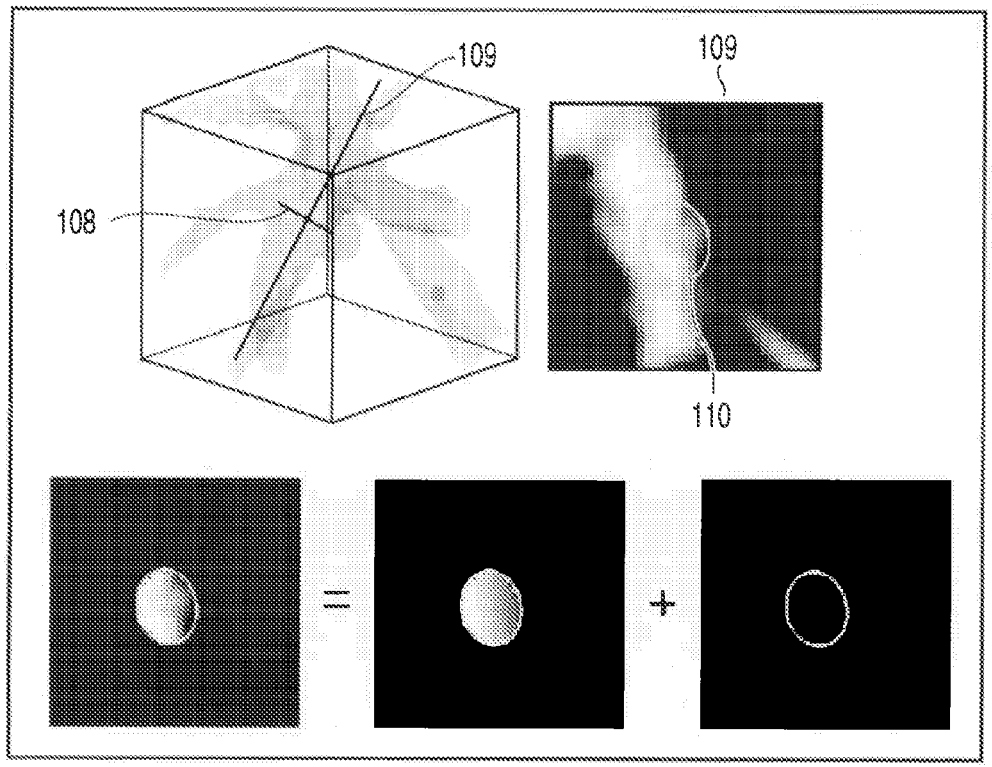

This will be explained with reference to FIGS. 16A and 16B. FIGS. 16A and 16B are views showing another nodule that has adhered to a blood vessel. Further, FIG. 16A shows an example where an observation reference point is present near a starting point of an observation reference line, and FIG. 16B shows an example where the observation reference point is present near a middle point of the observation reference line. As shown in lower schematic views in FIGS. 16A and 16B, a part in an ellipse model in a processing target image corresponding to the observation plane 109 (which will be referred to as an image in the ellipse model hereinafter) can be decomposed to a component whose intensity linearly varies in accordance with a coordinate in the plane (which will be referred to as an inear component of the image in the ellipse model hereinafter) and any other component (which will be referred to as an non-linear component of the image in the ellipse model). When the ellipse model substantially matches with a horizontal cross section of a blood vessel or when it substantially matches with a cross section of the module as shown in FIG. 16A, a fluctuation in a intensity of the image in the ellipse model can be explained as a fluctuation in a intensity of the non-linear component of the image in the ellipse model. However, for example, when the ellipse model overlaps a vertical cross section of the blood vessel while deviating from the center of the blood vessel as shown in FIG. 16B, many of fluctuations in the intensity in the image in the ellipse model can be explained as a fluctuation in the intensity of the inear component of the image in the ellipse model. In general, a case similar to that depicted in FIG. 16B may possibly occur at a transition part between the nodule that has adhered to the blood vessel and the blood vessel.

Furthermore, when this state occurs, the further search is meaningless, and hence occurrence of this state is determined as the end condition. A judgment on achievement of this end condition can be realized by the following processing. At each position of the observation reference point, a contribution ratio of the non-linear component of the image in the ellipse model is calculated by dividing a standard deviation of the intensity in the non-linear component of the image in the ellipse model by a standard deviation of the intensity in the image in the ellipse model. Moreover, when the contribution ratio of the non-linear component of the image in the ellipse model is smaller than a preset given lower limit value, this end condition is achieved.

If such an end condition is not achieved at all, the determination unit 13 advances to step Sb9 from step Sb8. At step Sb9, the determination unit 13 moves the observation reference point on the observation reference line 108 by a fixed small distance. As a result, the observation plane also moves with the observation reference point. Then, the determination unit 13 repeats the processing at step Sb4 and the subsequent steps. As a result, the determination unit 13 repeats the process of deforming the ellipse model to calculate an area of the cross section of the expanded nodule candidate region in the ellipse model while moving the observation reference point by one space distance until the end condition is achieved.

When the end condition is achieved, the determination unit 13 advances to step Sb10 from step Sb8. In step Sb10, the determination unit 13 calculates a quotient obtained by dividing a value of the second integrator by a value of the first integrator. This quotient represents a volume ratio of a expanded nodule candidate region distal part with respect to a expanded nodule candidate region proximal part in regard to a currently selected search reference point. Additionally, the determination unit 13 records the thus calculated volume ratio. Then, the determination unit 13 repeats step Sb1 and the subsequent steps. As a result, the determination unit 13 calculates and records a volume ratio with respect to each of all search reference points 107 obtained in regard to the expanded nodule candidate region 103.

When calculation of the volume ratios of each of all search reference points 107 obtained in regard to the expanded nodule candidate region 103 is finished, an unselected search reference point is not found at step Sb1. Thus, in such a case, the determination unit 13 advances to step Sb11 from step Sb1. It is to be noted that, when the search reference point 107 cannot be obtained in regard to the expanded nodule candidate region 103 at all, the determination unit 13 advances to step Sb11 from step Sb1 immediately after starting the processing depicted in FIG. 10 without proceeding to step Sb2 and the subsequent steps. In step Sb11, the determination unit 13 determines a value obtained by subtracting "1" from a maximum value of quotients recorded in regard to all search reference points as a diminution index of the nodule candidate region 102. It is to be noted that, when the search reference point 107 is not obtained at all, the maximum value of the recorded quotients is "0".

The thus calculated diminution index is a characteristic amount that summarizes a relationship between the nodule candidate region 102 and its continuous structure. In more detail, the decreasing degree is a characteristic amount representing a relative volume diminution index of a expanded nodule candidate region distal part with respect to a expanded nodule candidate region proximal part that is obtained by searching the expanded nodule candidate region 103 from the center of gravity 102a of the nodule candidate region 102 over a centrifugal distance.

When calculation of the diminution index is finished as explained above, the determination unit 13 advances to step Sa10 from step Sa9 depicted in FIG. 2. In step Sa10, the determination unit 13 determines whether the nodule candidate region 102 is a nodule. When the nodule candidate region 102 is a part of a lung blood vessel, both the proximal part and the distal part of the expanded nodule candidate region 103 associated with the nodule candidate region 102 are nothing more or less than a part of the lung blood vessel, and hence the diminution index is small even though it is present. That is, the diminution index is close to zero. On the other hand, when the nodule candidate region 102 corresponds to a nodule isolated from the blood vessel, a volume of the distal part of the expanded nodule candidate region 103 is smaller than that of the proximal part of the expanded nodule candidate region 103, and hence the diminution index is close to 1 that is a maximum value thereof. The determination unit 13 uses such properties as can be revealed from the diminution index as well as a relatively simple characteristic amount, e.g., an effective diameter or intensity contrast of the nodule candidate region 102, to make the above-explained judgment.

(Image Display for Image Reading Assistance)

The image data processing unit 14 analyzes characteristics concerning a nodule candidate region determined as a nodule as explained above and a peripheral region of this nodule candidate region. Further, the display image generating unit 15 generates a display image representing the characteristics. The display unit 16 displays this display image.

First Display Image Example

FIG. 17A is a view showing a display image 200.

The display image generating unit 15 combines a display image 201 representing one of nodule candidate regions in a volume rendering (VR) display mode with an image 202 representing a multi-planar reconstruction (MPR) cross section concerning a peripheral region in a perspective display mode to generate the display image 200. As the MPR cross section represented by the image 202, any one of an axial cross section, a sagittal cross section, a coronal cross section, and a oblique cross section can be used. The image 202 includes blood vessels, bronchial tubes, or substantial structures that are not subjected to region extraction processing.

It is to be noted that FIG. 17A schematically shows an arrangement of the image 201 and the image 202 in the display image 200, and details of the respective images are not shown.

FIG. 17B is a view showing a display image 210.

The display image generating unit 15 generates the image 210 as an image that represents an MPR cross section expressed by the image 202 in a planar manner. The display image generating unit 15 may display the display image 200 alone in the display unit 16 or may display the display image 200 and the display image 210 in parallel in the display unit 16.

It is to be noted that FIG. 17B schematically shows the display image 210 and details of this image are not shown.

The display image generating unit 15 varies the MPR cross section shown as the image 202 in a vertical direction in accordance with operation by an operator. At this time, when the display image 210 is also displayed, the MPR cross section represented by the display image 210 is also changed.

Second Display Image Example

FIG. 18 is a view showing a display image 220. It is to be noted that, in FIG. 18, like reference numbers denote images equal to those in FIG. 17A, thereby omitting a detailed explanation thereof.

The display image generating unit 15 combines an image 221 representing tubular structures that are present in a peripheral region in the VR display mode with images 201 and 202 to generate the display image 220. The tubular structures are, e.g., bronchial tubes, blood vessel structures, or spiculas (a spicular structure inherent to a malignant tumor) that are peripheral structures of a nodule candidate, and it is extracted by the image data processing unit 14. The image data processing unit 14 utilizes foreground information or uses a technique, e.g., a region growing method from a nodule candidate surface side, to extract a tubular structure. The display image generating unit 15 may generate the display image 220 in such a manner that the image 221 is colored to be readily recognized. It is to be noted that a length of the spicula is generally 20 mm or below. When displaying the spicula as the image 221, the display image generating unit 15 may generate the display image 220 in such a manner that the image 221 is colored in accordance with its length to be readily recognized.

The display image generating unit 15 may display the display image 220 alone in the display unit 16 or may display the display image 220 and the display image 210 depicted in FIG. 17B in parallel in the display unit 16.

It is to be noted that FIG. 18 schematically shows an arrangement of the images 201, 202, and 221 in the display image 220 and details of the respective images are omitted.

Third Display Image Example

Figure 19:
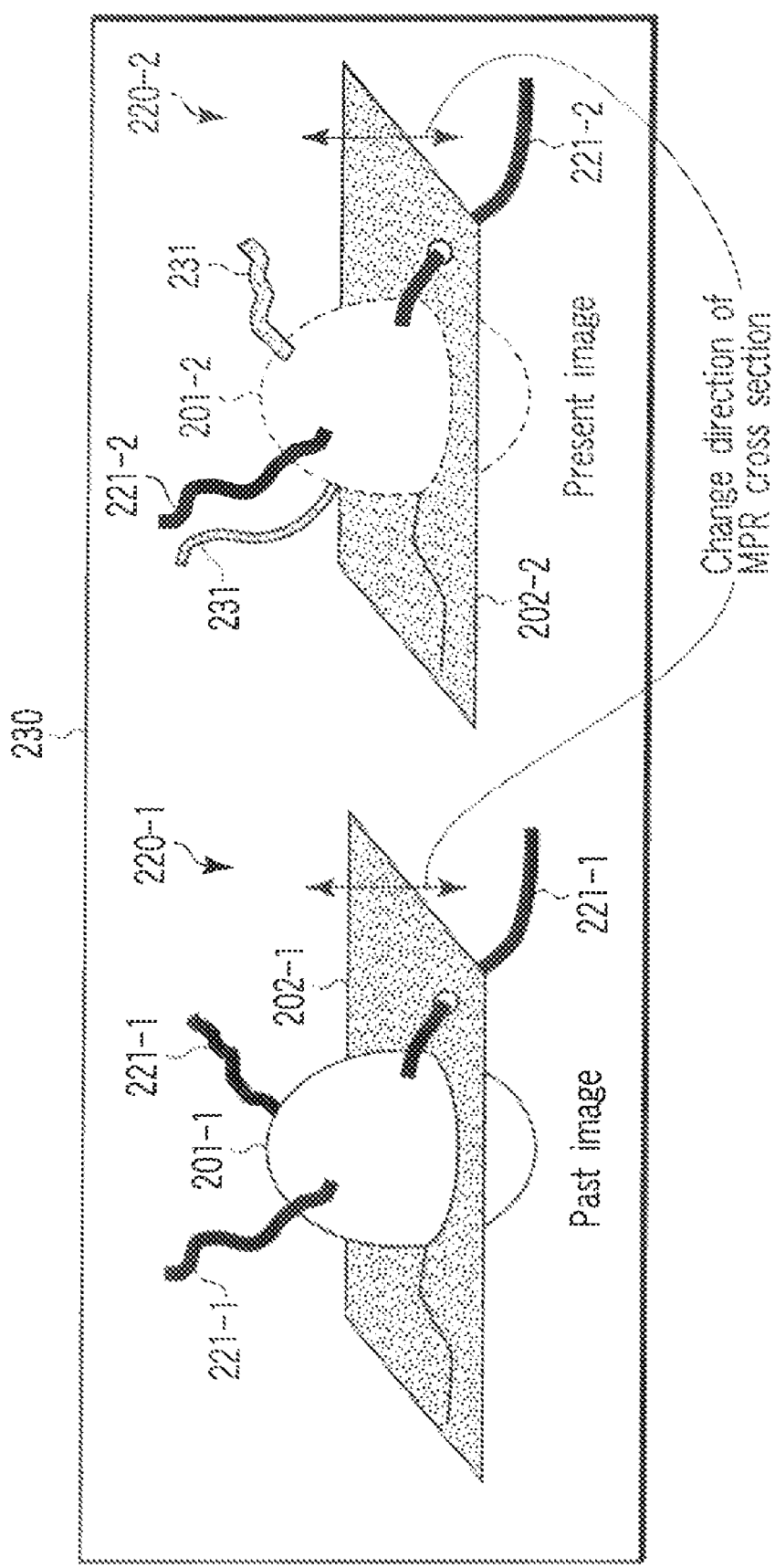
FIG. 19 is a view showing a display image concerning a third display image example according to the first embodiment.

FIG. 19 is a view showing a display image 230. It is to be noted that, in FIG. 19, reference numbers having "−1" or "−2" added to the ends of the same reference number as those used in FIG. 18 denote images equal to those in FIG. 18, thereby omitting a detailed explanation thereof. It is to be noted that the reference number having "−1" added to the end denotes an image based on three-dimensional image data collected in the past. Reference number having "−2" added to the end designates an image based on the most recently collected three-dimensional data.

The display image generating unit 15 aligns an image 220-1 and an image 220-2 to generate an image 230. The display image generating unit 15 includes an image 231 representing time-varying portions of a nodule candidate peripheral structure. However, the image representing time-varying portions can be included in the image 220-1.

It is to be noted that a past three-dimensional image and a present three-dimensional image must be positioned to trace an vary of the nodule candidate peripheral structure. In order to realize this, blood vessels around a nodule candidate or branching parts of bronchial tubes around a nodule candidate in a local three-dimensional space including the same nodule candidate region specified based on the past image and the present image can be specified, and a specified point or a specified structure in such a part can be used to position the two local three-dimensional spaces.

It is to be noted that FIG. 19 schematically shows an arrangement of the images 220-1, 220-2, and 231 in the display image 230 and details of the respective images are not shown.

Fourth Display Image Example

Figure 20:
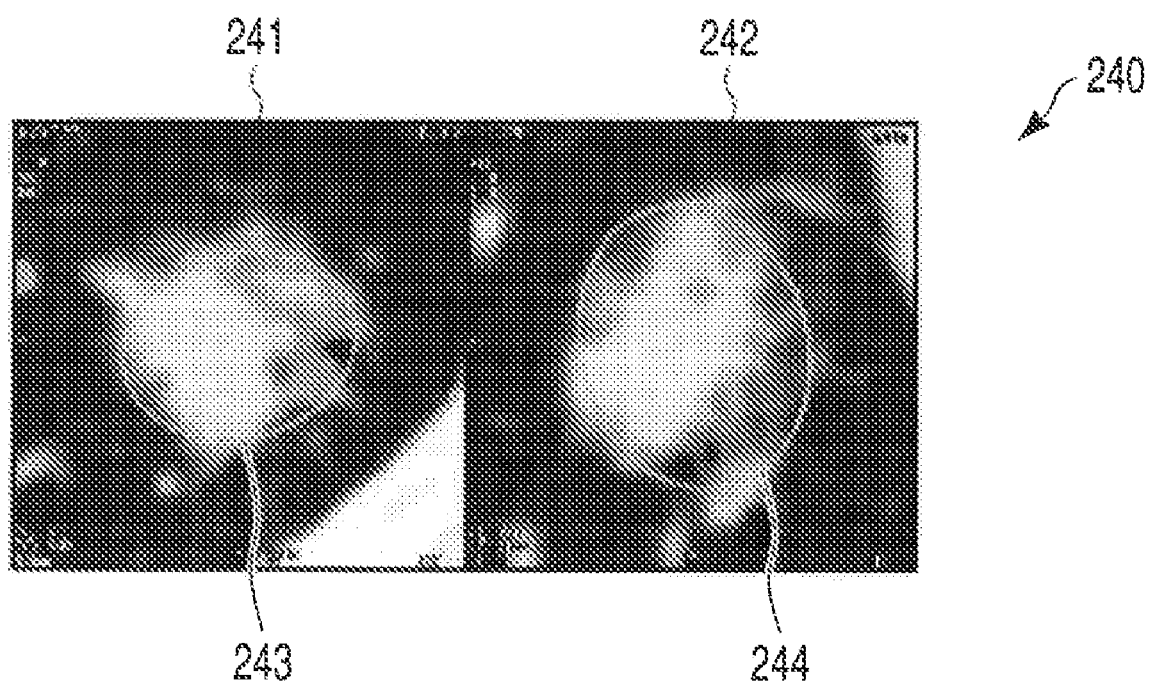
FIG. 20 is a view showing a display image concerning a fourth display image example according to the first embodiment.

FIG. 20 is a view showing a display image 240.

The display image generating unit 15 generates ellipses 243 and 244 that are intersection lines of image cross sections of cross-sectional images 241 and 242. The display image generating unit 15 superimposes the ellipses 243 and 244 and the cross-sectional images 241 and 242 each including a nodule candidate region to generate the display image 240. The ellipses may be elongated by increasing their longer axes with their centers kept at the same positions.

The display image generating unit 15 may display such an image as depicted in FIG. 7A and the image 240 in parallel.

Fifth Display Image Example

Figure 21:
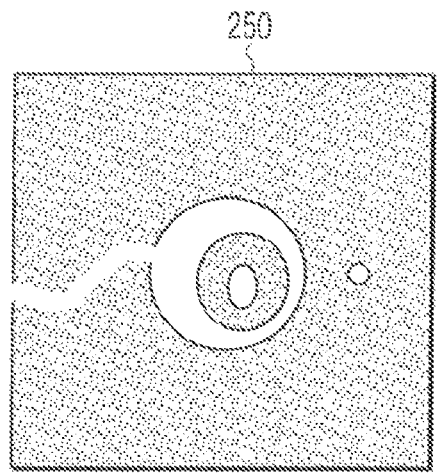
FIG. 21 is a view showing a display image concerning a fifth display image example according to the first embodiment.

FIG. 21 is a view showing a display image 250.

The display image generating unit 15 generates a display image 250 in such a manner that an analytical value/functional value (e.g., a normalized image) for each voxel in a nodule region is displayed within the same cross section as an MPR display cross section of a peripheral structure in colors based on the MPR display scheme. The analytical value/functional value is obtained by the image data processing unit 14. As the analytical value/functional value, a ratio of a past image and a present image in intensity value in the nodule candidate region (a intensity value of an HU (Hounsfield unit) in case of an X-ray CT) or a difference value of the same can be used in follow-up of the nodule candidate. This is an image that is useful when observing a ground-glass opacity (GGO) demonstrating a possibility of a lung cancer or a precursor lesion in an X-ray CT image for follow-up.

Further, the image data processing unit 14 may perform histogram analysis of a intensity value in the nodule candidate region, and the display image generating unit 15 may generate a display image representing a range of a characteristic intensity value alone in the histogram. Such a display image is useful when observing details of an aspect in the nodule.

It is to be noted that FIG. 21 shows how a display color varies in accordance with an analytical value/functional value but details of the image are not shown.

Sixth Display Image Example

Figure 22:
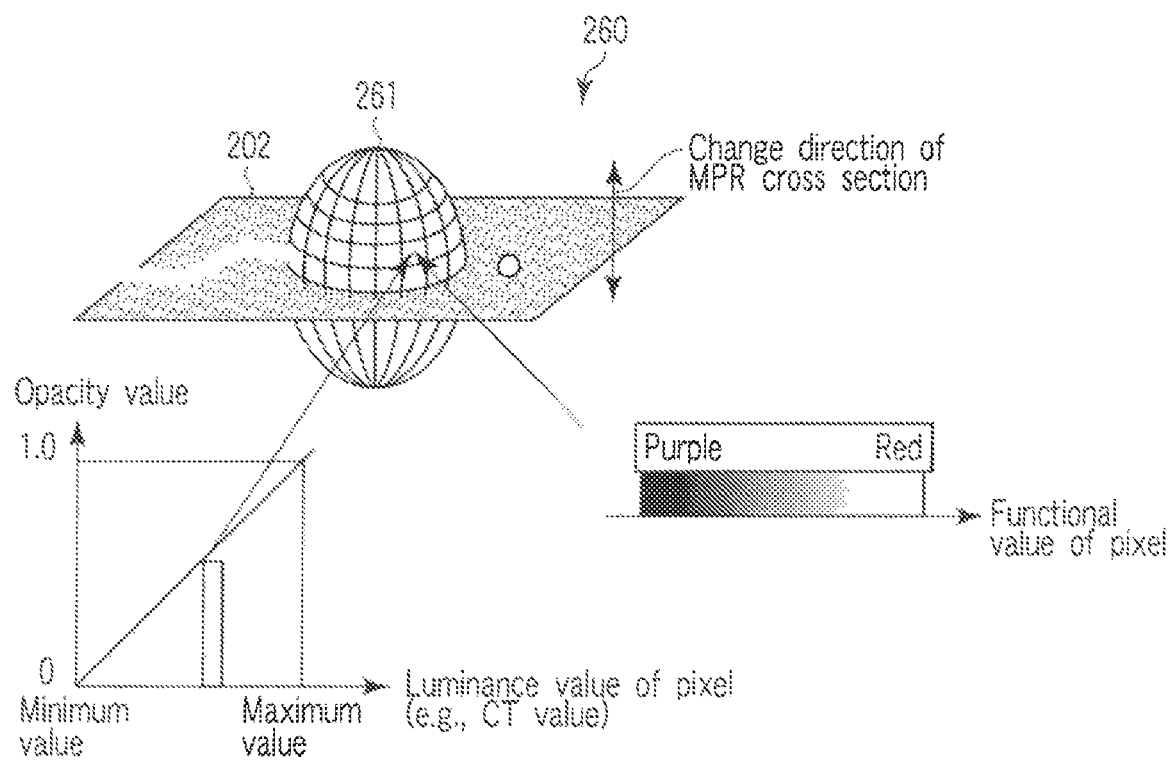
FIG. 22 is a view showing a display image concerning a sixth display image example according to the first embodiment.

FIG. 22 is a view showing a display image 260. It is to be noted that, in FIG. 22, like reference numbers denote the same images as those in FIG. 17A, thereby omitting a detailed explanation thereof.

The display image generating unit 15 combines an image 261 that shows one of nodule candidate regions in a VR display mode with an image 202 to generate the display image 260. The image 261 represents a nodule candidate region while assigning a CT value that is intensity information of a nodule as an opacity and assigning a functional value as a color image. FIG. 22 shows a intensity value and a functional value on a given line in a three-dimensional nodule candidate region.

That is, as explained above, in follow-up of a nodule candidate, a ratio in intensity value in the nodule candidate region or a difference value of a past image and a present image is associated as the functional value, and an HU value of the present image is determined as the opacity, and a part having a high intensity value at the present moment is thereby further emphatically colored, thus obtaining a volume rendering image.

It is to be noted that each MPR cross-sectional image depicted in FIGS. 17 to 22 may be an MPR image of a cross section with a given thickness (a so-called MPR image with a thickness) or maximum intensity projection (MIP) image.

Seventh Display Image Example

The display image generating unit 15 generates a display image representing a position of a nodule candidate region. In this example, the display image generating unit 15 changes a display conformation of the nodule candidate region in accordance with a size thereof. For example, the image data processing unit 14 obtains an average value of three axis lengths or a maximum value of the three axis lengths of the ellipse model as a nodule size with respect to each nodule candidate region. The display image generating unit 15 changes whether the obtained nodule size is to be shown in the display image or changes a display color in accordance with whether the nodule size is equal to or above a threshold value.

It is to be noted that the display image generating unit 15 may record an time-varying of the nodule size so that the nodule size can be shown in the display image or a different display color can be assigned to the display image even though the nodule size is less than the threshold value when an amount of change is large.

Thus, according to the first embodiment, an diagnosing reading doctor can readily visually recognize characteristics of the nodule candidate region determined as a nodule by the determination unit 13 and its peripheral region. Furthermore, based on the characteristics, the diagnosing reading doctor can judge whether the nodule candidate region determined as the nodule by the determination unit 13 is really a nodule.

Second Embodiment

FIG. 23 is a view showing a structure of a computer-aided image diagnostic processing device 3 according to a second embodiment. It is to be noted that like reference numbers denote parts equal to those in FIG. 1, thereby omitting a detailed explanation thereof.

The computer-aided image diagnostic processing device 3 shown in FIG. 23 processes three-dimensional data acquired by a multi-slice CT 2. The computer-aided image diagnostic processing device 3 includes a nodule candidate region specifying unit 11, a expanded nodule candidate region specifying unit 12, a determination unit 13, a display unit 16, an input section 31, and a display image generating unit 32. That is, the computer-aided image diagnostic processing device 3 includes the display image generating unit 32 in place of the display image generating unit 15 in the computer-aided image diagnostic processing device 1, and further includes the input section 31. The computer-aided image diagnostic processing device 3 does not include an image data processing unit 14.

This computer-aided image diagnostic processing device 3 can use, e.g., a general-purpose computer device as basic hardware. Moreover, the nodule candidate region specifying unit 11, the expanded nodule candidate region specifying unit 12, the determination unit 13, and the display image generating unit 32 can be realized when a processor mounted on the computer device executes a medical diagnostic imaging assistance program. In this example, the computer-aided image diagnostic processing device 3 may be realized by previously installing the medical diagnostic imaging assistance program in the computer device, or may be realized by recording the medical diagnostic imaging assistance program in a removable recording medium, e.g., a magnetic disk, a magneto-optical disk, an optical disk, or a semiconductor memory, or distributing the medical diagnostic imaging assistance program through a network to be installed in the computer device. It is to be noted that all or some of the respective sections can be also realized by hardware, e.g., a logic circuit. Furthermore, each of these sections can be also realized by combining hardware with software control.

The input section 31 inputs a user specification concerning an arbitrary position in an image displayed in the display unit 16. As the input section 31, a known pointing device, e.g., a mouse, can be utilized.

The display image generating unit 32 generates a display image that is provided for diagnosing reading by a medical doctor based on a judgment region in the determination unit 13, three-dimensional image data acquired by the multi-slice CT 2, and a user instruction input through the input section 31.

Operation of the thus configured computer-aided image diagnostic processing device 3 will now be explained.

A nodule candidate region and a peripheral region are specified by the nodule candidate region specifying unit 11, the expanded nodule candidate region specifying unit 12, and the determination unit 13 like the first embodiment.

(First Image Reading Assistance Processing)

Figure 24:
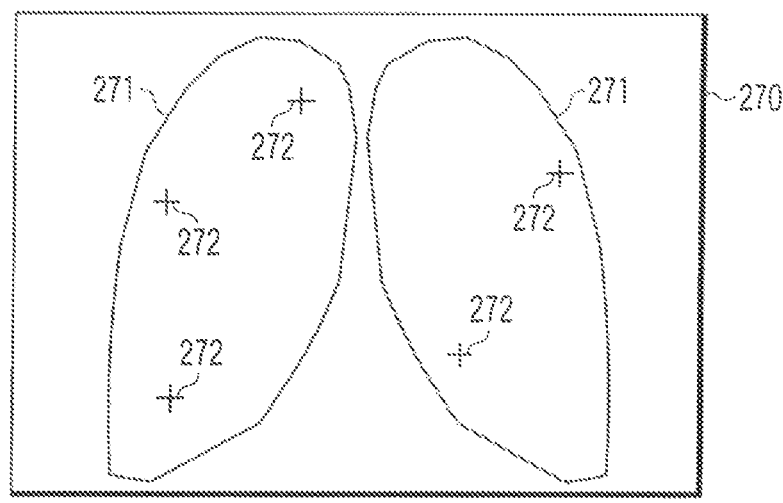
FIG. 24 is a view showing an example of a first display image concerning first diagnosing reading assistance processing according to the second embodiment.

Meanwhile, when an diagnosing reading doctor performs diagnosing reading, the display image generating unit 32 first generates a display image representing, e.g., an image of one cross section that is one of an axial image and an MPR image of orthogonal three cross-sections based on three-dimensional image data, and displays it in the display unit 16. It is to be noted that the display image generating unit 32 generates a display image representing a reference lung field image, e.g., an X-ray perspective image in this example. The diagnosing reading doctor inputs a specification of a position of a nodule candidate in the image through the input section 31 while observing the display image in the display unit 16. The display image generating unit 32 determines and stores a position of the nodule candidate determined by the diagnosing reading doctor based on a user operation input through the input section 31. This storage can be realized by, e.g., writing information indicative of the position in a storage medium, e.g., a hard disk, that is built in or externally provided to a general-purpose computer device used as basic hardware of the computer-aided image diagnostic processing device 3. Additionally, the display image generating unit 32 includes each mark representing the position of the nodule candidate determined by the diagnosing reading doctor in the display image. FIG. 24 is a view showing an example of a display image 270 including the mark representing the position of the nodule candidate determined by the diagnosing reading doctor. This display image 270 is formed with a mark 272 being superimposed on a reference lung filed image 271 in a coronal direction. The mark 272 represents the position of the nodule candidate determined by the diagnosing reading doctor. The mark 272 has a solid-line cross shape and a yellow display color.

Figure 25:
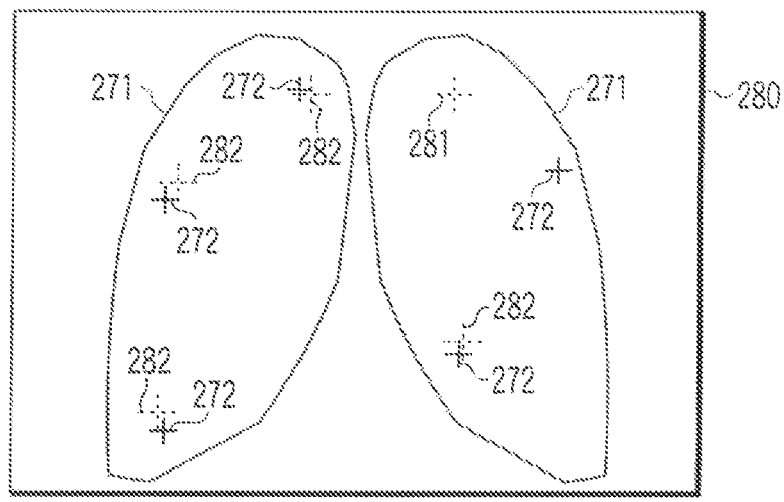
FIG. 25 is a view showing an example of a second display image concerning the first diagnosing reading assistance processing according to the second embodiment.

When the diagnosing reading doctor finishes specifying the position of the nodule candidate, the display image generating unit 32 updates the display image to, e.g., such a display image 280 as depicted in FIG. 25. The display image generating unit 32 superimposes marks 281 and 282 on the display image 270 to generate a display image 280. Each of the marks 281 and 282 represents a position of a nodule candidate region determined as a nodule by the determination unit 13. Each of the marks 281 and 282 has a broken-line cross shape. The mark 281 has an orange display color, and the mark 282 has a blue display color. Of positions of nodule candidate regions determined as nodules by the determination unit 13, a position whose minimum distance with respect to the position specified by the diagnosing reading doctor is equal to or above a threshold value is represented by the mark 281, and a position whose minimum distance is less than the threshold value is represented by the mark 282. As explained above, the mark 282 is displayed when the nodule candidate region determined as a nodule by the determination unit 13 is regarded as being equal to the nodule candidate specified by the diagnosing reading doctor, and the mark 281 is displayed in any other case.

The diagnosing reading doctor who has performed the first diagnosing reading (hereinafter, "a first diagnosing reading doctor) or a different second diagnosing reading doctor can readily recognize a difference between a judgment result obtained by the first diagnosing reading doctor and a judgment region acquired by the computer-aided image diagnostic processing device 3 by observing the display image 280. Further, the first or second diagnosing reading doctor makes a final judgment on whether a position represented by each of the marks 272, 281, and 282 corresponds to a nodule. Furthermore, the first or second diagnosing reading doctor inputs a specification of the position finally determined as a nodule through the input section 31. The display image generating unit 32 determines and stores the position of the nodule determined by the first or second diagnosing reading doctor based on the user operation input through the input section 31. It is to be noted that, when the position of the nodule is specified near the mark 282, a position of this mark 282, a position of the mark 272 regarded as being equal to the mark 282, or a middle point of the marks 282 and 272 is determined as the position of the nodule. The display image generating unit 32 can also accept a specification of the position of the nodule by selecting the displayed mark 272, 281, or 282. In this case, determining a position of the selected mark as the position of the nodule can suffice. Moreover, when a position specified by the first diagnosing reading doctor as the position of the nodule candidate or a position determined as the nodule by the determination unit 13 is not finally determined as the nodule, the display image generating unit 32 stores such a position separately from a position finally determined as the nodule. It is to be noted that the display image generating unit 32 may determine a position that is not finally determined the nodule upon accepting a specification indicative of denial of the nodule through the input section 31, or may determine the same as a position that is not specified as the nodule.

Figure 26:
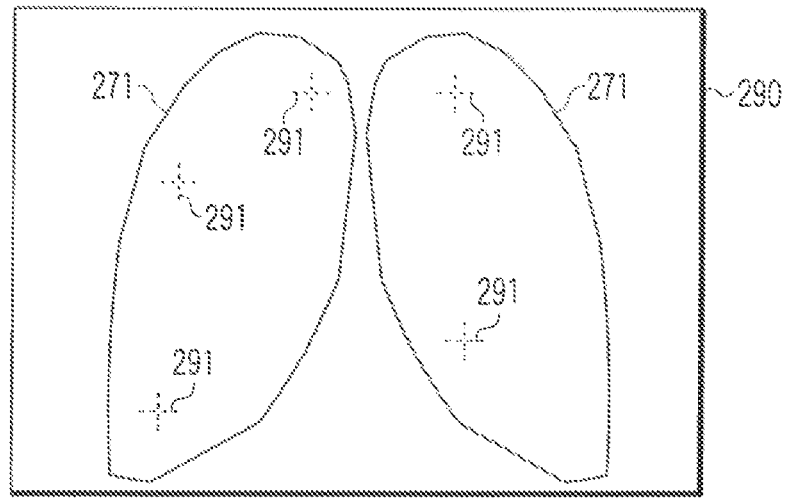
FIG. 26 is a view showing an example of a third display image concerning the first diagnosing reading assistance processing according to the second embodiment.

When the first or second diagnosing reading doctor finishes specifying a position of the nodule, the display image generating unit 32 updates the display image to, e.g., such a display image 290 as depicted in FIG. 26. The display image generating unit 32 superimposes a mark 291 on the reference lung field image 271 to generate a display image 290. The mark 291 represents a position of the nodule specified by the first or second diagnosing reading doctor. The mark 291 has a broken-line cross shape and a green display color.

It is to be noted that the display image generating unit 32 may update the display image to show a mark 290 in place of the mark 272, 281, or 282 shown at a position of one nodule every time the position of one nodule is specified.

Although the final judgment by the diagnosing reading doctor is made while observing an image in an arbitrary single cross section that is an axial image or an MPR image of orthogonal three cross sections, the display image generating unit 32 may automatically display the marks if the marks can be displayed in this cross section as an observation target.

(Second Image Reading Assistance Processing)

Figure 27:
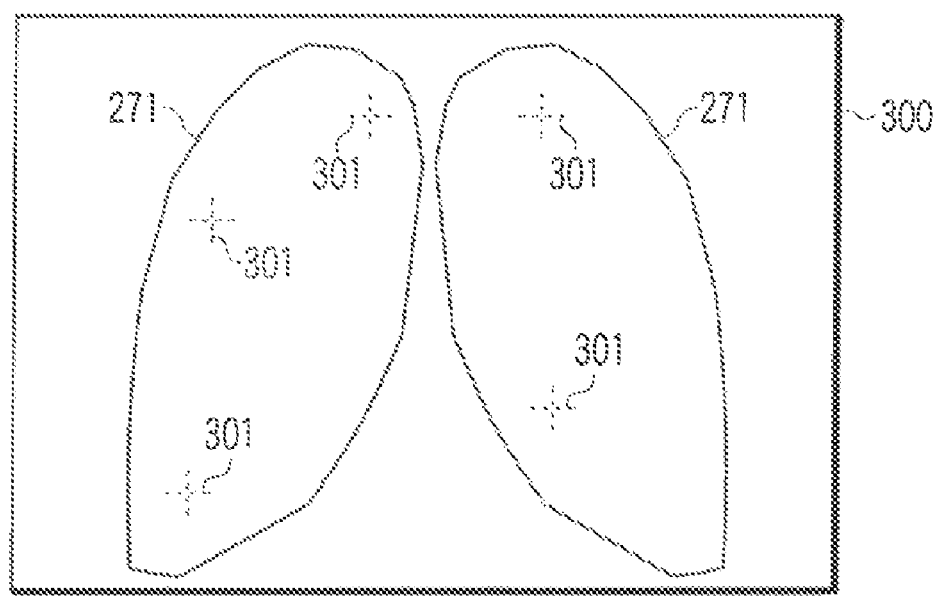
FIG. 27 is a view showing an example of a first display image concerning second diagnosing reading assistance processing according to the second embodiment.

The display image generating unit 32 first generates such a display image 300 as shown in FIG. 27, and displays it in the display unit 16. The display image generating unit 32 superimposes each mark 301 on the reference lung field image 271 to generate the display image 300. The mark 301 represents a position of a nodule candidate region determined as a nodule by the determination unit 13. The mark 301 has a broken-line cross shape and an orange display color.

The diagnosing reading doctor observes the display image 300 to judge a position of a nodule while making reference to the judgment result by the determination unit 13. Further, the diagnosing reading doctor input a specification of a position finally determined as the nodule through the input section 31. The display image generating unit 32 determines and stores the position of the nodule determined by the first or second diagnosing reading doctor based on a user operation input through the input section 31.

Figure 28:
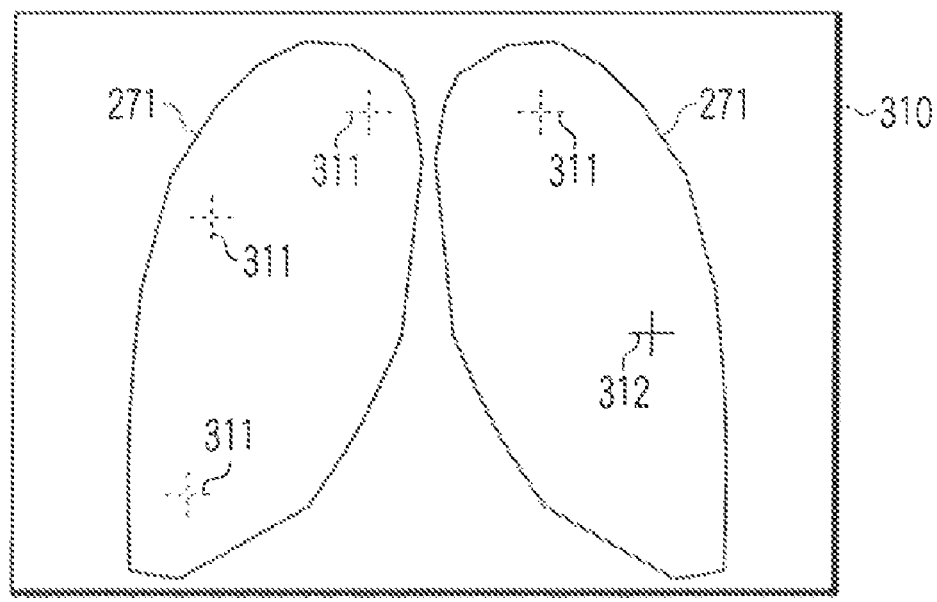
FIG. 28 is a view showing an example of a second display image concerning the second diagnosing reading assistance processing according to the second embodiment.

When the diagnosing reading doctor finishes specifying the position of the nodule, the display image generating unit 32 updates the display image to, e.g., such a display image 310 as depicted in FIG. 28. The display image generating unit 32 superimposes marks 311 and 312 on the reference lung field image 27 to generate the display image 310. The mark 311 represents the position of the nodule specified by the diagnosing reading doctor at the same position as that where each mark 301 is displayed. The mark 291 has a broken-line cross shape and a green display color. The mark 312 represents the position of the nodule specified by the diagnosing reading doctor at a position different from that where the mark 301 is displayed. The mark 312 has a solid-line cross shape and a green display color.

When the position determined as the nodule by the determination unit 13 is not determined as the nodule by the diagnosing reading doctor, the display image generating unit 32 stores this position separately from the position determined as the nodule. It is to be noted that the display image generating unit 32 may determine the position that is not finally determined as the nodule upon accepting a specification indicative of denial of the nodule through the input section 31 or may determine it as a position that is not specified as the nodule.

It is to be noted that the display image generating unit 32 may update the display image in such a manner that the mark 311 is displayed in place of the mark 301 displayed at a position of one nodule or the mark 312 is newly added every time the position of one nodule is specified.

Although the final judgment by the diagnosing reading doctor is made while observing an image in an arbitrary single cross section that is one of an axial image and an MPR image of orthogonal three cross sections, the display image generating unit 32 automatically displays the mark if the mark can be displayed in this cross section as an observation target.

As explained above, according to the second embodiment, double diagnosing reading by the computer-aided image diagnostic processing device 3 and the diagnosing reading doctor or multiple diagnosing reading by the computer-aided image diagnostic processing device 3 and the first and second diagnosing reading doctors can be readily carried out.

Third Embodiment

Since a structure of a computer-aided image diagnostic processing device according to a third embodiment is the same as that of the computer-aided image diagnostic processing device 3 according to the second embodiment, thereby omitting an illustration thereof. Further, FIG. 23 is used for an explanation of the third embodiment.

The third embodiment is different from the second embodiment in processing carried out by a display image generating unit 32. That is, the display image generating unit 32 according to the third embodiment is realized by changing a medical diagnostic imaging assistance program executed by a processor mounted on a computer device used as basic hardware.

Operation of the computer-aided image diagnostic processing device 3 according to the third embodiment will now be explained.

A nodule candidate region and its peripheral region are specified by a nodule candidate region specifying unit 11, a expanded nodule candidate region specifying region 12, and a determination unit 13 like the first embodiment.

Figure 29:
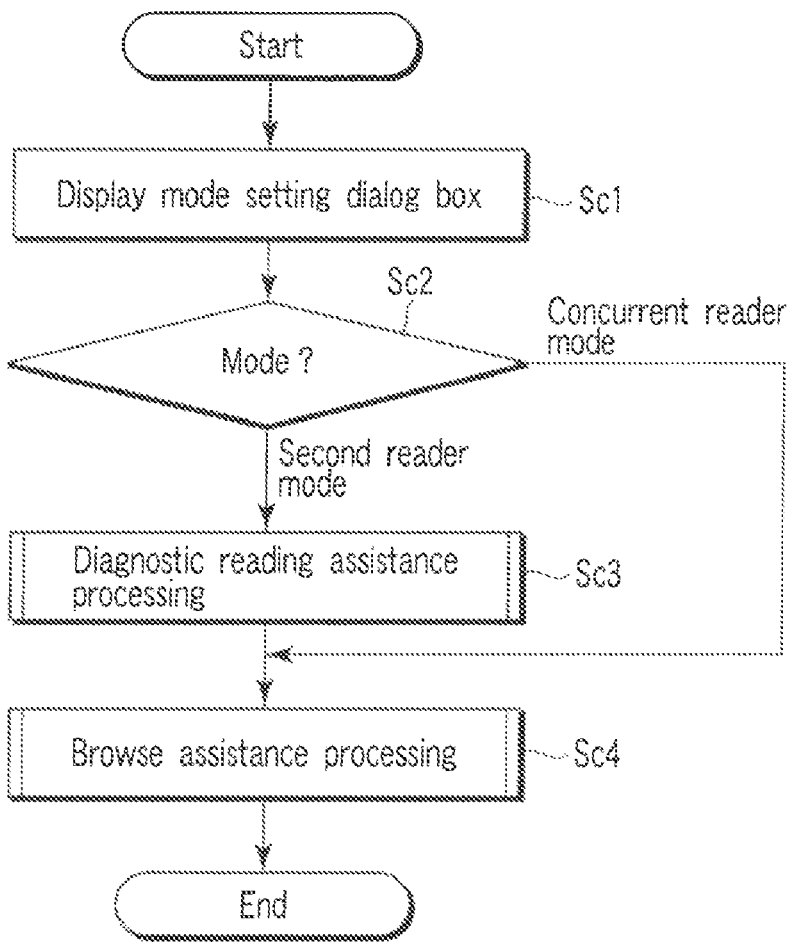
FIG. 29 is a flowchart showing processing of a display image generating unit 32 in FIG. 23 according to a third embodiment.

FIG. 29 is a flowchart showing processing of the display image generating unit 32 to assist diagnosing reading.

In step Sc1, the image generating unit 32 displays a mode setting dialog box in a display unit 16.

Figure 30:
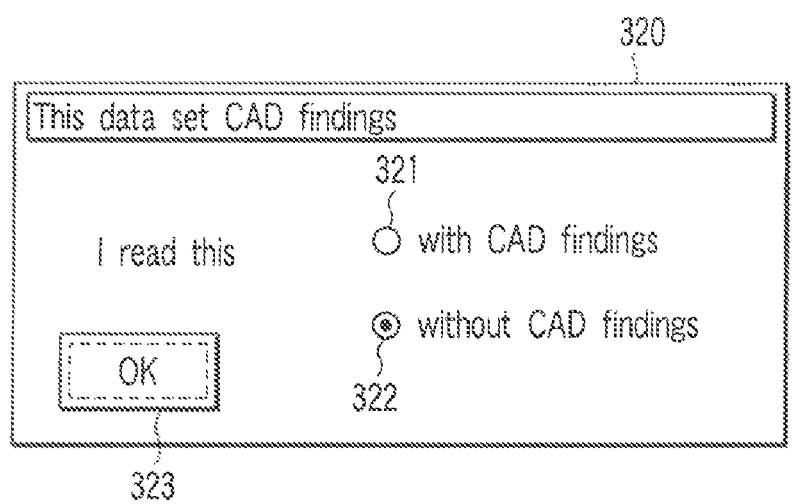
FIG. 30 is a view showing an example of a mode setting dialog box.

FIG. 30 is a view showing an example of a mode setting dialog box 320. This dialog box 320 includes radio buttons 321 and 322 and an OK button 323. When an diagnosing reading doctor operates an input section 31, he/she activates the radio button 321 in case of selecting a concurrent reader mode or the radio button 322 in case of selecting a second reader mode, and then pushes the OK button.

In step Sc2, the display image generating unit 32 determines a selected mode in accordance with the above-explained operation in the dialog box 320 carried out by the diagnosing reading doctor. Further, when the second reader mode is selected, the display image generating unit 32 advances to step Sc3 from step Sc2. In step Sc3, the display image generating unit 32 executes diagnosing reading assistance processing.

FIG. 31 is a flowchart of the diagnosing reading assistance processing.

In step Sd1, the display image generating unit 32 displays an diagnosing reading screen in the display unit 16.

Figure 32:
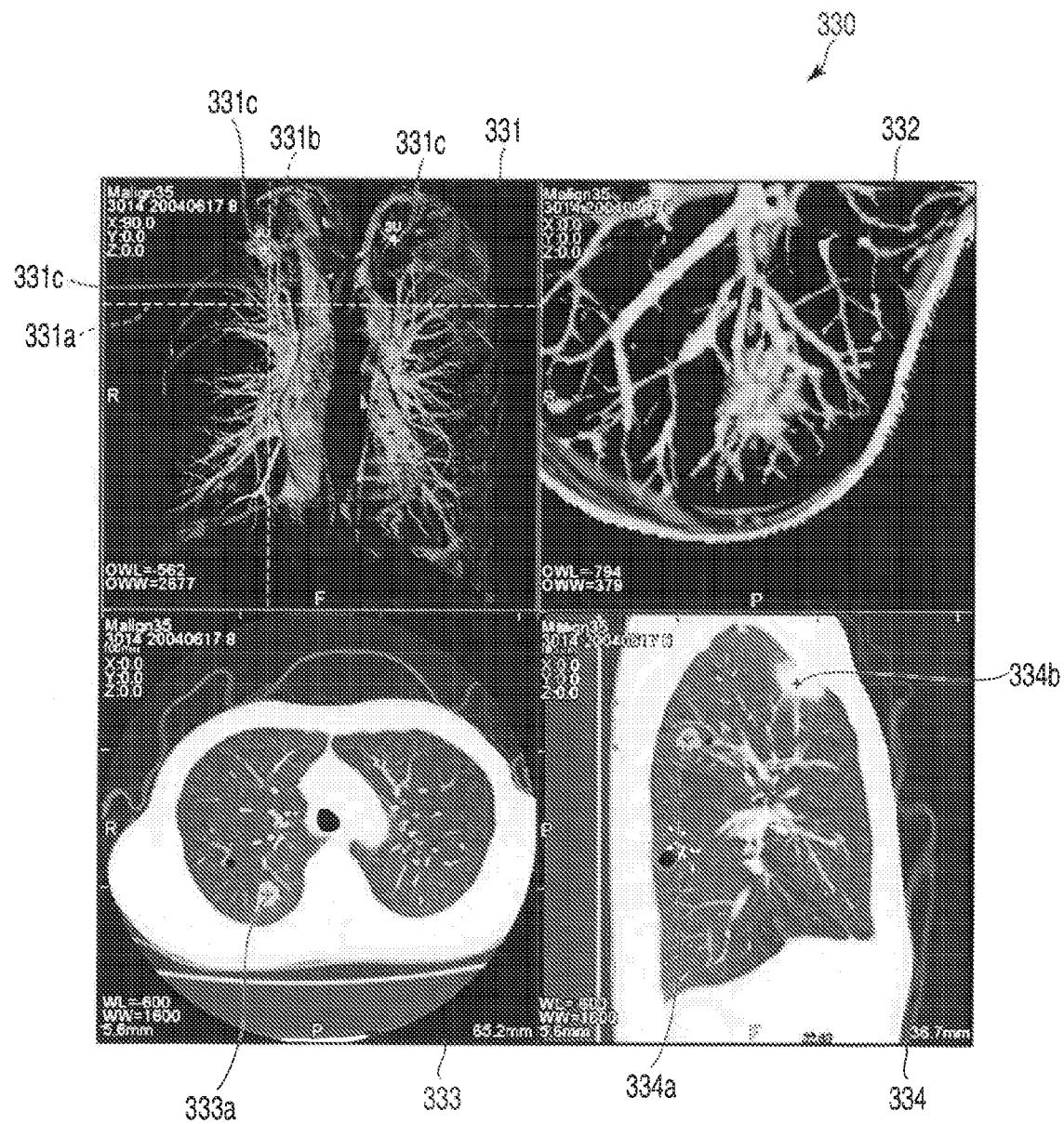
FIG. 32 is a view showing an example of an diagnosing reading screen.

FIG. 32 is a view showing an example of an diagnosing reading screen 330. As shown in FIG. 32, the diagnosing reading screen includes a VR image 331, a VR image 332, an axial image 333, and a sagittal image 334.

The VR image 331 represents a three-dimensional image of an entire lung by volume rendering. A projection image obtained by signal-averaging the pixel values of the pixels of the three-dimensional image of the entire lung in the coronal direction may be used in place of the VR image 331. Further, an MIP image may be used. The VR image 331 represents a part of the VR image 331 in an enlarged manner. The VR image 332 represents a three-dimensional image of a selected nodule candidate. However, in an initial state, since a nodule candidate is not selected, the VR image 332 is, e.g., a blank. A coronal image may be used in place of the VR image 332. The axial image 333 represents a cross-sectional image of an axial cross section specified by a cross section specifying line 331a included in the VR image 331. The axial image 333 in the initial state is an image of the uppermost cross section as viewed in the axis direction of the head. The sagittal image 334 represents a cross-sectional image in regard to a sagittal cross section specified by a cross section specifying line 331b included in the VR image 331. The sagittal image 334 may be replaced with a coronal image.

The viewing direction of the sagittal image 334 is automatically set by the position information of the observed nodule candidate. If the nodule is located in the right lung, the viewing direction is right-to-left in a patient. If the nodule is located in the left lung, the viewing direction is left-to-right in a patient.

In a state where such an diagnosing reading screen is displayed, the display image generating unit 32 waits for operation by the diagnosing reading doctor in steps Sd2 to Sd5.

The diagnosing reading doctor can specify a change of cross section by, e.g., arbitrarily dragging the cross section specifying line 331a or the cross section specifying line 331b or by selecting and dragging one cross sectional image. The selected cross sectional image may be displayed in an enlarged scale so that it occupies the entire diagnosing reading screen. Further, when such a change in cross section is specified, the display image generating unit 32 advances to step Sd6 from step Sd2. In step Sd6, the display image generating unit 32 updates the diagnosing reading screen to change a position of the cross section specifying line 331a or the cross section specifying line 331b and also change the axial image 333 or the sagittal image 334 in accordance with this change in position. When this updating is finished, the display image generating unit 32 returns to the standby mode in steps Sd2 to Sd5.

On the other hand, when the diagnosing reading doctor has found a structure that is considered as a nodule in the axial image 333, the sagittal image 334, or the coronal image, he/she specifies a region including this structure as a nodule candidate. When the nodule candidate is specified in this manner, the display image generating unit 32 advances to step Sd7 from step Sd3. In step Sd7, the display image generating unit 32 registers nodule candidate information, e.g., a position of the specified nodule candidate. Further, in step Sd8, the display image generating unit 32 updates the image for diagnosing reading in such a manner that a mark representing the newly specified nodule candidate is included. When this updating is finished, the display image generating unit 32 returns to the standby mode in steps Sd2 to Sd5.

Marks 331c, 333a, 334a, and 334b in FIG. 32 are marks representing nodule candidates. The display colors of the marks 331c, 333a, 334a, and 334b are all, e.g., yellow.

When a plurality of nodule candidates are present in a displayed cross section, an operator can select one of these candidates by, e.g., clicking it. When the nodule candidate is selected in this manner, the display image generating unit 32 advances to step Sd9 from step Sd4. In step Sd9, the display image generating unit 32 updates the diagnosing reading screen. In this updating operation, the mark representing the selected nodule candidate is changed to a mark representing a nodule candidate that is currently selected. Furthermore, in this updating operation, the VR image 332 is changed to display a periphery of the selected nodule candidate. In FIG. 32, marks 333a and 334a represent selected nodule candidates. A mark 334b represents a non-selected nodule candidate.

When diagnosing reading is finished, the diagnosing reading doctor instructs to terminate the operation. Then, the display image generating unit 32 terminates the diagnosing reading assistance processing.

When the diagnosing reading assistance processing is finished, the display image generating unit 32 advances to step Sc4 in FIG. 29. It is to be noted that the display image generating unit 32 advances to step Sc4 from step Sc3 when the concurrent reader mode is selected. That is, when the concurrent reader mode is selected, the display image generating unit 32 does not perform the diagnosing reading assistance processing.

In step Sc4, the display image generating unit 32 executes browse assistance processing.

FIG. 33 is a flowchart of the browse assistance processing.

In step Se1, the display image generating unit 32 displays a browse screen in the display unit 16.

Figure 34:
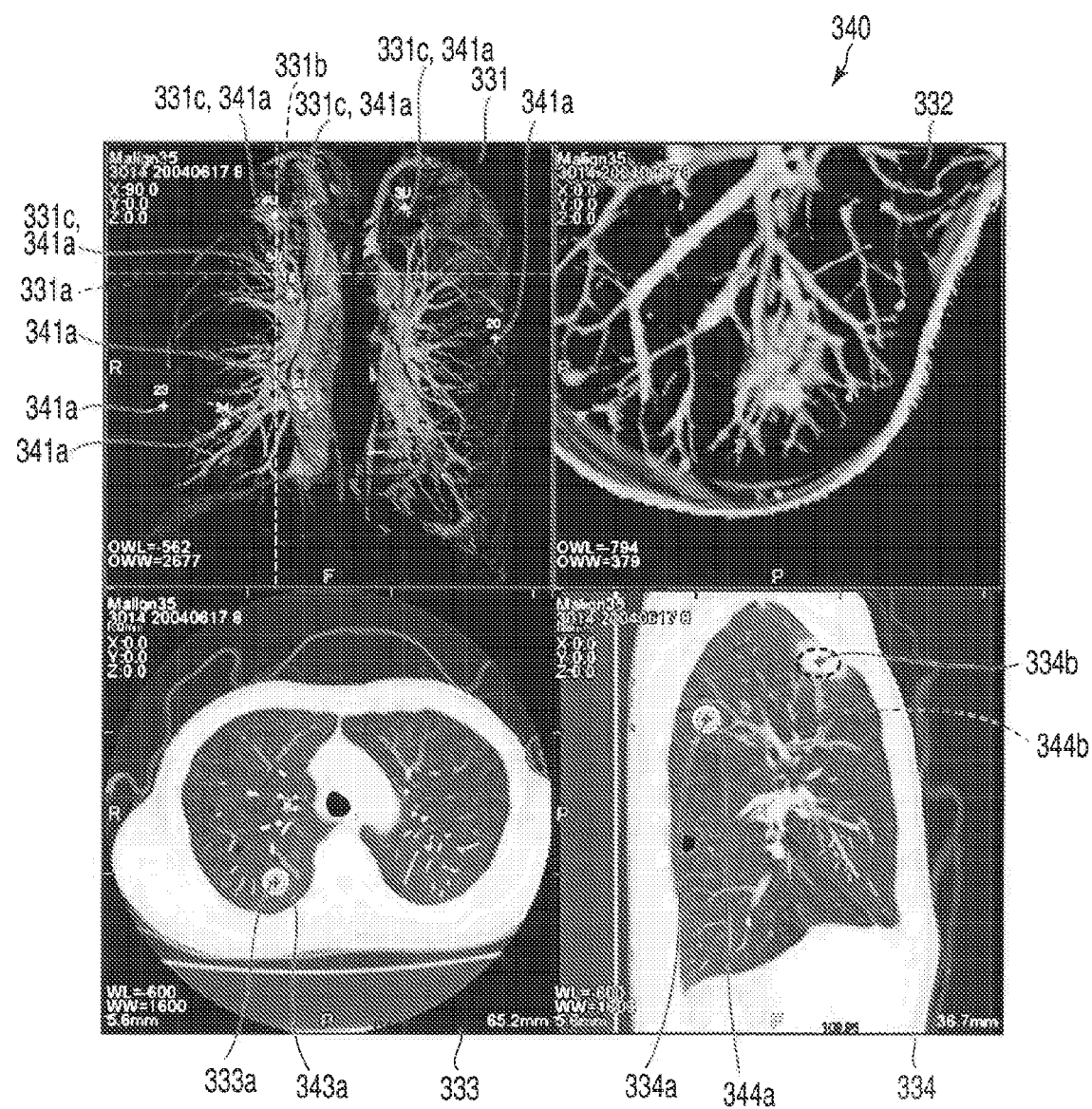
FIG. 34 is a view showing an example of a browse screen.

FIG. 34 is a view showing an example of a browse screen 340. As shown in FIG. 34, the browse screen 340 includes a VR image 331, a VR image 332, an axial image 333, and a sagittal image 334 like the image 330 for diagnosing reading. The browse screen 340 is different from the image 330 for diagnosing reading in that the browse screen 340 includes marks 341a, 343a, 344a, and 344b representing positions of nodule candidate regions determined as nodules by the determination unit 13 as well as the marks 331c, 333a, 334a, and 334b representing nodule candidates specified in the diagnosing reading assistance processing by the diagnosing reading doctor. The display colors of the marks 331c, 333a, 334a, and 334b, and the marks 341a, 343a, 344a, and 344b are, e.g., yellow and blue, respectively. Moreover, as the mark 343a, 344a, or 344b, an ellipse that is an intersection line of an ellipsoidal model concerning a nodule candidate represented by each mark and an image cross section of the axial image 333 or the sagittal image 334 is used. It is to be noted that the axial image 333 in the browse screen in the initial state concerns the uppermost cross section in a head region direction.

In a state where such a browse screen is displayed, the display image generating unit 32 waits for operation by the diagnosing reading doctor in steps Se2 to Se7. It is to be noted that the diagnosing reading doctor who performs operation when executing browse assistance processing is generally different from the diagnosing reading doctor who performs operation when executing diagnosing reading assistance processing.

The diagnosing reading doctor can specify a change of cross section by, e.g., arbitrarily dragging the cross section specifying line 331a or the cross section specifying line 331b or by selecting and dragging one cross sectional image. The selected cross sectional image may be displayed in an enlarged scale so that it occupies the entire diagnosing reading screen. Moreover, when such a change in cross section is specified, the display image generating unit 32 advances to step Se8 from step Se2. In step Se8, the display image generating unit 32 updates the browse screen to change a position of the cross section specifying line 331a or the cross section specifying line 331b and also change the axial image 333 or the sagittal image 334 in accordance with this change. When this updating operation is finished, the display image generating unit 32 returns to the standby mode in steps Se2 to Se7. It is to be noted that the display image generating unit 32 may continuously change the cross section at a fixed speed. Then, a work burden on the diagnosing reading doctor can be alleviated. Additionally, when the diagnosing reading doctor can select an operation of changing a cross section in accordance with an instruction from the diagnosing reading doctor or an operation of automatically changing a cross section, flexible operation meeting the needs of the diagnosing reading doctor is possible, thereby further increasing convenience.

The diagnosing reading doctor confirms an already specified nodule candidate while changing a displayed cross section. At this time, the diagnosing reading doctor can select one of already specified nodule candidates by, e.g., clicking it as required. When the nodule candidate is selected in this manner, the display image generating unit 32 advances to step Se9 from step Se3. In step Se9, the display image generating unit 32 updates the browse screen. In this updating operation, a mark representing a selected nodule candidate is changed to a mark representing a nodule candidate that is currently selected. Further, in this updating operation, the VR image 332 is change to display a periphery of the selected nodule candidate. In FIG. 34, the marks 333a, 334a, 343a, and 344a represent selected nodule candidates. The marks 334b and 344b represent non-selected nodule candidates. That is, of the marks shown in the axial image 333 or the sagittal image 334 in the marks representing positions of nodule candidate regions determined as nodules by the determination unit 13, the marks representing selected nodule candidates are indicated by a solid line, and the marks representing non-selected nodule candidates are indicated by a broken line. When updating the browse screen is finished, the display image generating unit 32 returns to the standby mode in steps Se2 to Se7.

Incidentally, in the display image generating unit 32, in a case where a nodule candidate is designated as being different from a selected nodule candidate and the shortest distance between the designated nodule candidate and the selected nodule candidate is less than a predetermined threshold value, the designated nodule candidate is determined as being the same as the selected nodule candidate.

When a displayed mark obstructs confirming an image, the imaging reading doctor instructs to erase this mark. When erasing the mark is instructed in this manner, the display image generating unit 32 advances to step Se10 from step Se4. In step Se10, the display image generating unit 32 updates the browse image to erase the specified mark. In a browse screen 350 depicted in FIG. 35, the mark 334b included in the browse screen 340 is erased. It is to be noted that the mark is temporarily erased, and it is redisplayed when, e.g., redisplay is instructed. When updating the browse screen is finished, the display image generating unit 32 returns to the standby mode in steps Se2 to Se7.

Figure 35:
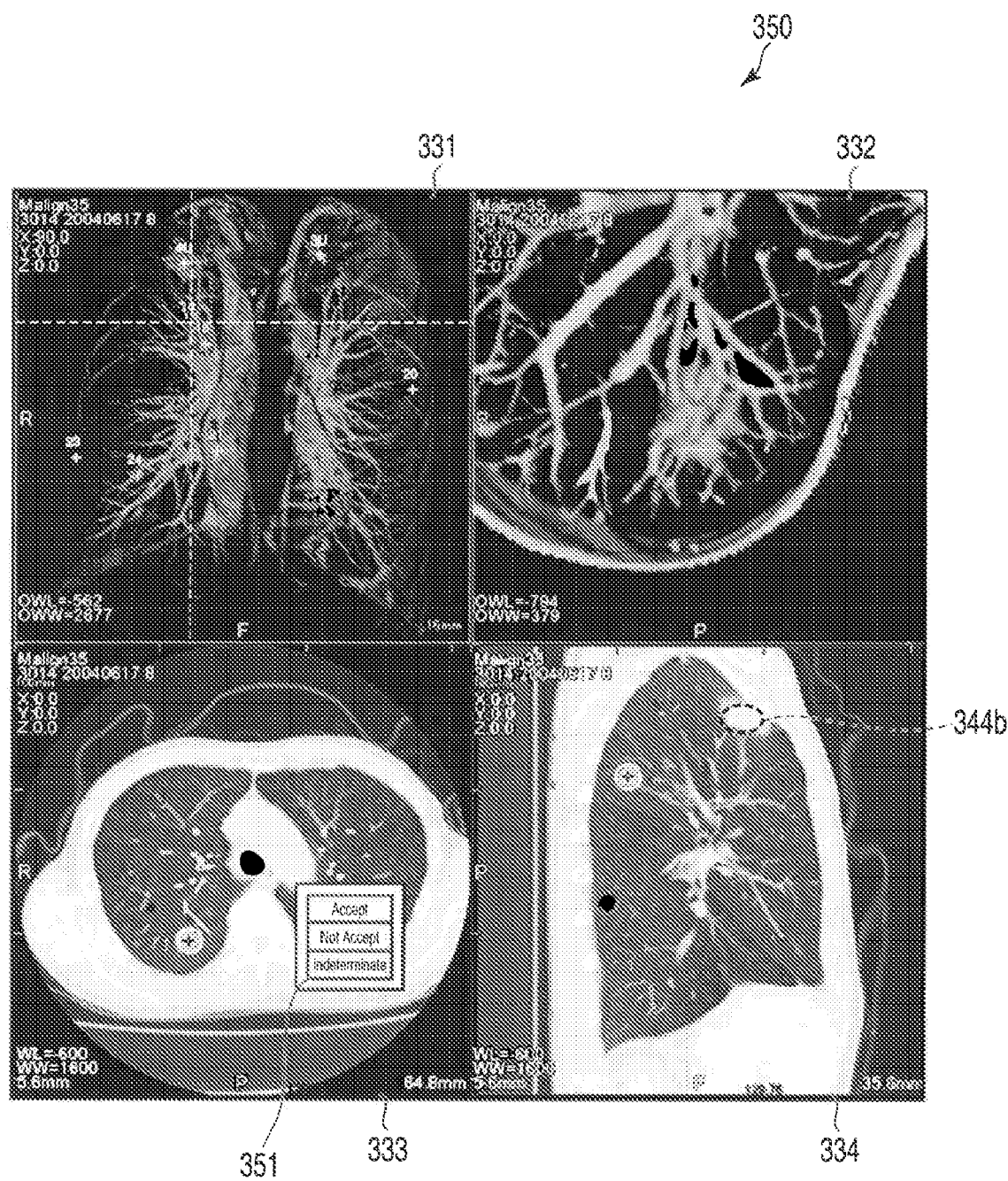
FIG. 35 is a view showing an example of a browse screen updated from the browse screen depicted in FIG. 34.
Figure 36:
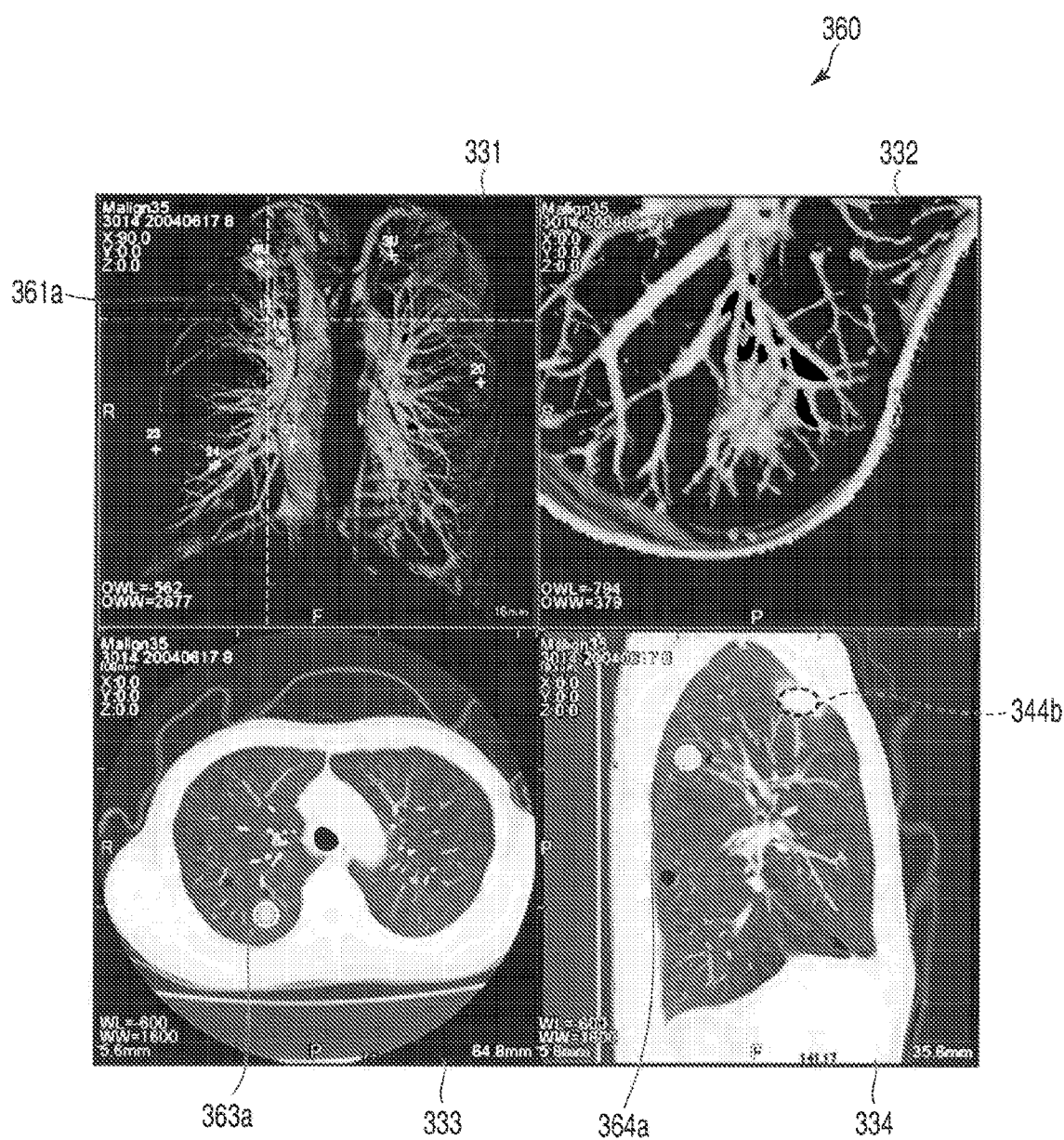
FIG. 36 is a view showing an example of a browse screen updated from the browse screen depicted in FIG. 35.

When a judgment upon one nodule candidate is finished, the diagnosing reading doctor instructs to display a judgment menu about this nodule candidate. When displaying the judgment menu is instructed in this manner, the display image generating unit 32 advances to step Se11 from step Se5. In step Se11, the display image generating unit 32 displays a judgment menu 351 as shown in FIG. 35, for example. The judgment menu 351 includes an "Accept" button, a "Not Accept" button, and an "Intermediate" button. The diagnosing reading doctor presses the "Accept" button when it is determined that the nodule candidate is a nodule, presses the "Not Accept" button when it is determined that the nodule candidate is not a nodule, and presses the "Intermediate" button when the nodule candidate does not correspond to both cases. Thus, in step Se12, the display image generating unit 32 accepts pressing such a button to input a judgment result. Further, in step Se13, the display image generating unit 32 updates the browse screen to change the mark while reflecting the input judgment result. In a browse screen 360 depicted in FIG. 36, each of the marks 331c and 341a in FIG. 34 is changed to a mark 361a, each of the marks 333a and 343a in FIG. 34 is changed to a mark 363a, and each of the marks 334a and 344a in FIG. 34 is changed to a mark 364a, respectively. It is to be noted that the display colors of the marks 361a, 363a, and 364a are, e.g., green. It is to be noted that marks concerning a plurality of nodule candidates that are simultaneously selected since minimum distances thereof are less than a threshold value are changed to one mark after the judgment as explained above. When updating the browse screen is finished, the display image generating unit 32 returns to the standby mode in steps Se2 to Se7.

If the diagnosing reading doctor newly finds a structure that is considered to be a nodule while confirming a nodule candidate already specified as explained above, he/she specifies a region including this structure as a nodule candidate. When the nodule candidate is specified in this manner, the display image generating unit 32 advances to step Se14 from step Se6. In step Se14, the display image generating unit 32 registers nodule candidate information, e.g., a position of the specified nodule candidate. Furthermore, in step Se15, the display image generating unit 32 updates the browse image in such a manner that a mark representing the newly specified nodule candidate is included. When this updating operation is finished, the display image generating unit 32 returns to the standby mode in steps Se2 to Se7.

When confirming the nodule candidate is finished, the diagnosing reading doctor issues an end instruction. Then, the display image generating unit 32 terminates the browse assistance processing.

As explained above, according to the third embodiment, in the second reader mode, multiple diagnosing reading by the computer-aided image diagnostic processing device 3 and the first and second diagnosing reading doctors can be readily carried out. Moreover, in the concurrent reader mode, double diagnosing reading by the computer-aided image diagnostic processing device 3 and the diagnosing reading doctor can be easily performed.

This embodiment can be modified in many ways as follows.

In the first embodiment, a nodule candidate region that is not determined as a nodule by the determination unit 13 may be a display target.

In regard to display images concerning the fourth display image example according to the first embodiment, images concerning three or more different timings may be displayed in parallel.

In the display image generating unit 15 according to the first embodiment, one of many display image examples explained above may be fixedly applied, or a plurality of display image examples may be selectively applied in response to a request from a user.

Various kinds of marks according to the second and third embodiments may have other arbitrary shapes, and the display colors of these marks may be arbitrarily changed. Additionally, any other technique, e.g., changing a thickness of each line, may be utilized to discriminate the marks from each other.

In the display image generating unit 32 according to the second embodiment, one of the two types of diagnosing reading assistance processing may be fixedly applied, or the two types of diagnosing reading assistance processing may be selectively applied in response to a request from a user, for example.

In the display image generating unit 32 according to the second embodiment, arbitrary display images explained in the first embodiment may be displayed in parallel.

Although each of the foregoing embodiments is explained in relation to a judgment upon a nodular abnormality in a lung cancer, the technique according to the present invention can be applied to a varicose abnormality continuous with a blood vessel, e.g., a cerebral aneurism that is a cerebrovascular disease.

In each of the foregoing embodiments, a three-dimensional image acquired by the multi-slice CT 2 is a processing target, but a three-dimensional image collected by any other diagnostic modality, e.g., an X-ray diagnostic apparatus, a magnetic resonance diagnostic apparatus, or an ultrasonic diagnostic apparatus, may be a processing target.

A nodule candidate region is not automatically specified, but a nodule candidate region specified by a user may be determined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A computer-aided image diagnostic processing apparatus comprising:
   a storage unit which stores a medical image representing the inside of a subject;
   a unit which specifies an anatomical abnormality candidate region included in the medical image; and
   a generation unit which generates a display image in which the abnormality candidate region is represented as a three-dimensional image based on volume rendering and at least a part of the peripheral region is represented as a cross-sectional image based on the medical image.

2. The computer-aided image diagnostic processing apparatus according to claim 1,
   wherein the generation unit generates as the display image an image in which the entire peripheral region is represented as a cross-sectional image.

3. The computer-aided image diagnostic processing apparatus according to claim 1,
   wherein the generation unit generates the display image as an image in which a part of the peripheral region is represented as a cross-sectional image and a part of the peripheral region is represented as a three-dimensional image based on volume rendering.

4. The computer-aided image diagnostic processing apparatus according to claim 1,
wherein the generation unit generates the display image as an image that represents an time-varying in the peripheral region.

5. The computer-aided image diagnostic processing apparatus according to claim 4,
wherein the generation unit generates the display image as an image in which a plurality of images representing the abnormality candidate region as a three-dimensional image based on volume rendering and at least a part of the peripheral region as a cross-sectional image are displayed in parallel with respect to each of a plurality of images representing the inside of the subject at each of a plurality of different timings in terms of time.

6. The computer-aided image diagnostic processing apparatus according to claim 1,
wherein the generation unit generates the display image as an image which represents a position where the abnormality candidate region is present and whose display conformation differs in accordance with a size of the abnormality candidate region.

7. The computer-aided image diagnostic processing apparatus according to claim 6,
wherein the generation unit generates the display image as an image which does not represent an abnormality candidate region whose size is less than a first threshold value.

8. A non-transitory computer readable storage medium storing a medical diagnostic imaging assistance program product that enables a computer to function as:
a unit which specifies an anatomical abnormality candidate region included in a medical image representing the inside of a subject; and
a generation unit which generates a display image in which the abnormality candidate region is represented as a three-dimensional image based on volume rendering and at least a part of the peripheral region is represented as a cross-sectional image based on the medical image.

* * * * *

UNITED STATES PATENT AND TRADEMARK OFFICE
CERTIFICATE OF CORRECTION

PATENT NO. : 7,978,897 B2
APPLICATION NO. : 11/758907
DATED : July 12, 2011
INVENTOR(S) : Hitoshi Yamagata et al.

Page 1 of 1

It is certified that error appears in the above-identified patent and that said Letters Patent is hereby corrected as shown below:

On the title page, Item (73), the second assignee's name is incorrect. Item (73) should read:

--(73) Assignees:  National University Corporation Kobe University, Kobe-shi (JP);
Toshiba Medical Systems Corporation, Otawara-shi (JP)--

Signed and Sealed this
Thirteenth Day of September, 2011

David J. Kappos
*Director of the United States Patent and Trademark Office*